US012477374B2

(12) United States Patent
Ge et al.

(10) Patent No.: US 12,477,374 B2
(45) Date of Patent: Nov. 18, 2025

(54) INFORMATION TRANSMISSION METHOD AND APPARATUS, AND STORAGE MEDIUM

(71) Applicant: Huawei Technologies Co., Ltd., Shenzhen (CN)

(72) Inventors: Cuili Ge, Beijing (CN); Kai Zhou, Shenzhen (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 18/154,176

(22) Filed: Jan. 13, 2023

(65) Prior Publication Data

US 2023/0156511 A1    May 18, 2023

Related U.S. Application Data

(63) Continuation of application No. PCT/CN2021/093899, filed on May 14, 2021.

(30) Foreign Application Priority Data

Jul. 15, 2020  (CN) .......................... 202010683078.3

(51) Int. Cl.
    H04W 24/10    (2009.01)
    H04M 15/00    (2006.01)
(52) U.S. Cl.
    CPC ........... *H04W 24/10* (2013.01); *H04M 15/66* (2013.01)
(58) Field of Classification Search
    CPC ..... H04W 24/10; H04W 24/02; H04W 88/14; H04W 88/18; H04W 92/24; H04W 24/08;
    (Continued)

(56) References Cited

U.S. PATENT DOCUMENTS 10,110,495 B1    10/2018    Sabella et al.
10,440,096 B2    10/2019    Sabella et al.
(Continued)

FOREIGN PATENT DOCUMENTS

CN    109275160    1/2019
CN    109314710    2/2019
(Continued)

OTHER PUBLICATIONS

3GPP TR 23.758 V17.0.0 (Dec. 2019), "3rd Generation Partnership Project; Technical Specification Group Services and System Aspects; Study on application architecture for enabling Edge Applications; (Release 17)," 113 pages.
(Continued)

*Primary Examiner* — Chuong A Ngo
(74) *Attorney, Agent, or Firm* — Slater Matsil, LLP

(57) ABSTRACT

This application provides an information transmission method and apparatus, and a storage medium. The method includes: A first server sends first information to a PCF, where the first information is for measuring a communication KPI corresponding to a first device, and the communication KPI includes a communication KPI between a UPF and the first server. The PCF sends a communication indicator measurement policy to an SMF based on the first information. The SMF sends a communication indicator measurement rule to a UPF according to the communication indicator measurement policy, and sends second information to the first server. The second information includes the communication KPI corresponding to the first device, or a parameter for obtaining the communication KPI corresponding to the first device. In this way, the first server may obtain the KPI between the UPF and the first server based on the second information.

19 Claims, 15 Drawing Sheets

(58) Field of Classification Search
CPC ....... H04W 8/02; H04W 16/10; H04W 28/06; H04M 15/66
See application file for complete search history.

(56) References Cited

U.S. PATENT DOCUMENTS

| | | | |
|---|---|---|---|
| 10,637,753 | B1 | 4/2020 | Taft et al. |
| 2020/0221346 | A1 | 7/2020 | Park et al. |
| 2022/0321435 | A1* | 10/2022 | Yao ................ H04W 24/08 |
| 2023/0199560 | A1* | 6/2023 | Nuggehalli ....... H04W 28/0917 455/450 |

FOREIGN PATENT DOCUMENTS

| | | |
|---|---|---|
| CN | 111083737 | 4/2020 |
| CN | 111294224 | 6/2020 |
| WO | 2020020461 | 1/2020 |
| WO | 2020033373 | 2/2020 |
| WO | 2020034911 | 2/2020 |
| WO | 2020092493 | 5/2020 |

OTHER PUBLICATIONS

Apple, "How to determine the Response time for the EAS," 3GPP TSG-SA WG6 Meeting #37-e, E-meeting, May 14-26, 2020, S6-200705, 7 pages.

Apple: "Pseudo-CR on Maximum Response Time and QoS for the EAS registration." 3GPP TSG-SA WG6 Meeting #37-e S6-200706 e-meeting, May 14-26, 2020. total 5 pages.

3rd Generation Partnership Project; Technical Specification Group Services and System Aspects; Architecture for enabling Edge Applications; (Release 17). 3GPP TS 23.558 V0.3.0 (Jun. 2020). total 70 pages.

3GPP TR 23.700-20 V0.4.0 (Jun. 2020), "3rd Generation Partnership Project; Technical Specification Group Services and System Aspects; Study on enhanced support of Industrial Internet of Things (IIoT) in the 5G System (5GS) (Release 17)," 56 pages.

3GPP TR 23.748 V0.4.0 (Jun. 2020), "3rd Generation Partnership Project; Technical Specification Group Services and System Aspects; Study on enhancement of support for Edge Computing in 5G Core network (5GC) (Release 17)," 189 pages.

3GPP TS 23.501 V16.5.0 (Jul. 2020), "3rd Generation Partnership Project; Technical Specification Group Services and System Aspects; System architecture for the 5G System (5GS); Stage 2(Release 16)," 441 pages.

3GPP TS 36.314 V15.2.0 (Dec. 2018), "3rd Generation Partnership Project; Technical Specification Group Radio Access Network; Evolved Universal Terrestrial Radio Access (E-UTRA); Layer 2—Measurements (Release 15)," 28 pages.

3GPP TS 38.314 V1.0.0 (Jun. 2020), "3rd Generation Partnership Project; Technical Specification Group Radio Access Network; NR; Layer 2 Measurements; (Release 16)," 18 pages.

* cited by examiner

INFORMATION TRANSMISSION METHOD AND APPARATUS, AND STORAGE MEDIUM

CROSS-REFERENCE TO RELATED APPLICATIONS

This application is a continuation of International Application No. PCT/CN2021/093899, filed on May 14, 2021, which claims priority to Chinese Patent Application No. 202010683078.3, filed on Jul. 15, 2020. The disclosures of the aforementioned applications are hereby incorporated by reference in their entireties.

TECHNICAL FIELD

This application relates to the field of communication technologies, and in particular, to an information transmission method and apparatus, and a storage medium.

BACKGROUND

Currently, an edge data network includes an edge configuration server (ECS) and a plurality of edge enabler servers (EESs). A plurality of edge applications (EASs) are registered on one EES. An EAS is an application deployed in the edge data network and is referred to as an application instance, and specifically refers to an instance of a server application program (for example, social media software, augmented reality (AR), or virtual reality (VR)) deployed and run on the edge data network. The EES provides some enabling capabilities for application instances deployed in the edge data network to better support application deployment on multi-access edge computing (MEC). The ECS is responsible for configuring the edge data network, for example, providing EES information for a user.

The user communicates with the EAS in the edge data network to obtain corresponding services from the EAS. Specifically, the user sends an EES selection request to the ECS to obtain information about a target EES. After receiving the EES selection request, the ECS performs security authentication. After the authentication succeeds, the ECS selects, based on a parameter in the EES selection request, a target EES that meets conditions, and sends the information about the target EES to the user. After receiving the information about the target EES, the user sends an EAS discovery request to the target EES. The EAS discovery request may carry a query filter for searching for a specific EAS.

Currently, when selecting an EES for the user, the ECS cannot select an EES that meets requirements for the user because key performance indicator (KPI) (such as delay and bandwidth) information between a UPF and the EES is not considered.

SUMMARY

Embodiments of this application provide an information transmission method and apparatus, and a storage medium, to obtain a communication KPI between a UPF and a first server.

According to a first aspect, an embodiment of this application provides an information transmission method, applied to a first server and including: sending first information to a policy control function PCF, where the first information is for measuring a communication key performance indicator KPI corresponding to a first device; and receiving second information from a user plane function UPF, where the second information includes the communication KPI corresponding to the first device, or a parameter for obtaining the communication KPI corresponding to the first device, where the communication KPI includes a communication KPI between the UPF and the first server.

In an implementation of the first aspect, when the second information includes the parameter for obtaining the communication KPI corresponding to the first device, the method further includes: obtaining, based on the second information, the communication KPI corresponding to the first device.

In an implementation of the first aspect, the method further includes: receiving information about a target application; and generating the first information based on the information about the target application.

In an implementation of the first aspect, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation of the first aspect, the first information includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

In an implementation of the first aspect, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In an implementation of the first aspect, the receiving second information from a user plane function UPF includes: receiving a first uplink measurement packet from the UPF, where the first uplink measurement packet carries the parameter, the parameter includes time at which the UPF sends the first uplink measurement packet, and the first uplink measurement packet is triggered by the first device; and the method further includes: sending a first downlink measurement packet to the UPF, where the first downlink measurement packet carries time at which the first server sends the first downlink measurement packet, and a destination device of the first downlink measurement packet is the first device.

In an implementation of the first aspect, the obtaining, based on the second information, the communication KPI corresponding to the first device includes: obtaining the communication KPI between the UPF and the first server based on the second information; and obtaining, based on the communication KPI between the UPF and the first server, the communication KPI corresponding to the first device.

In an implementation of the first aspect, the parameter further includes a downlink parameter, and the downlink parameter includes time at which the UPF receives the first downlink measurement packet, or transmission time of the first downlink measurement packet between the UPF and the first server; and the obtaining the communication KPI between the UPF and the first server based on the second information includes: obtaining a downlink communication KPI between the UPF and the first server based on the downlink parameter.

In an implementation of the first aspect, the obtaining the communication KPI between the UPF and the first server based on the second information includes: obtaining an uplink communication KPI between the UPF and the first server based on the time at which the UPF sends the first uplink measurement packet.

In an implementation of the first aspect, the first device is a target terminal device or a radio access network device, and obtaining the communication KPI between the first device and the first server based on the communication KPI between the UPF and the first server includes: obtaining a communication KPI between the first device and the UPF; and obtaining the communication KPI between the first device and the first server based on the communication KPI between the first device and the UPF and the communication KPI between the UPF and the first server.

In an implementation of the first aspect, the receiving second information from a user plane function UPF includes: receiving an uplink measurement packet from the UPF, where the uplink measurement packet carries the parameter, the parameter includes time at which the UPF sends the uplink measurement packet, and the uplink measurement packet is triggered by the first device; and the obtaining, based on the second information, the communication KPI corresponding to the first device includes: determining an uplink communication KPI between the UPF and the first server based on the parameter.

In an implementation of the first aspect, the method further includes: sending the uplink communication KPI between the UPF and the first server to the UPF.

In an implementation of the first aspect, the first downlink measurement packet further carries time at which the first server receives the first uplink measurement packet, or transmission time of the first uplink measurement packet between the UPF and the first server.

In an implementation of the first aspect, the method further includes: sending the communication KPI corresponding to the first device to an ECS, an EAS, or the target terminal device.

In an implementation of the first aspect, the first device is the target terminal device, and the method further includes: determining the target terminal device based on measurement configuration information, where the measurement configuration information includes at least one of a measurement area and application information.

In an implementation of the first aspect, the target terminal device is located in the measurement area; or the target terminal device is installed with an application corresponding to the application information; or the target terminal device is installed with an application corresponding to the application information, and the target terminal device is located in the measurement area.

In an implementation of the first aspect, before the determining the target terminal device based on measurement configuration information, the method further includes: receiving the measurement configuration information from a second server; or receiving the application information from a terminal device.

In an implementation of the first aspect, the first device is the target terminal device, and the method further includes: obtaining identification information of one or more terminal devices from the EAS, where the one or more terminal devices are terminal devices connected to the EAS; and determining a terminal device corresponding to the identification information of the one or more terminal devices as the target terminal device.

According to a second aspect, an embodiment of this application provides an information transmission method, applied to a policy control function PCF and including: receiving first information from a first server, where the first information is for measuring a communication key performance indicator KPI corresponding to a first device, and the communication KPI includes a communication KPI between a user plane function UPF and the first server; and sending a communication indicator measurement policy to a session management function SMF based on the first information, where the communication indicator measurement policy indicates to measure the communication KPI corresponding to the first device.

In an implementation of the second aspect, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation of the second aspect, the communication indicator measurement policy includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure a communication KPI between the UPF and the first server.

According to a third aspect, an embodiment of this application provides an information transmission method, applied to a session management function SMF and including: receiving a communication indicator measurement policy from a policy control function PCF, where the communication indicator measurement policy indicates to measure a communication key performance indicator KPI corresponding to a first device; and sending a communication indicator measurement rule to a user plane function UPF according to the communication indicator measurement policy, where the communication indicator measurement rule is for measuring the communication KPI corresponding to the first device, and the communication KPI includes a communication KPI between the UPF and a first server.

In an implementation of the third aspect, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and a UPF.

In an implementation of the third aspect, the communication indicator measurement rule includes the communication indicator measurement policy.

In an implementation of the third aspect, the communication indicator measurement policy includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

According to a fourth aspect, an embodiment of this application provides an information transmission method, applied to a user plane function UPF and including: receiving a communication indicator measurement rule from a session management function SMF, where the communication indicator measurement rule is for measuring a communication key performance indicator KPI corresponding to a first device; and sending second information to a first server according to the communication indicator measurement rule, where the second information includes the communication KPI corresponding to the first device, or a parameter for obtaining the communication KPI corresponding to the first device, where the communication KPI includes a communication KPI between the UPF and the first server.

In an implementation of the fourth aspect, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and a UPF.

In an implementation of the fourth aspect, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In an implementation of the fourth aspect, the sending second information to a first server according to the communication indicator measurement rule includes: sending a first uplink measurement packet to the first server according to the communication indicator measurement rule, where the first uplink measurement packet carries the parameter, the parameter includes time at which the UPF sends the first uplink measurement packet, and the first uplink measurement packet is triggered by the first device; and the method further includes: receiving a first downlink measurement packet from the first server, where the first downlink measurement packet carries time at which the first server sends the first downlink measurement packet, and a destination device of the first downlink measurement packet is the first device.

In an implementation of the fourth aspect, the sending second information to a first server according to the communication indicator measurement rule includes: obtaining the communication KPI between the UPF and the first server according to the communication indicator measurement rule; obtaining, based on the communication KPI between the UPF and the first server, the communication KPI corresponding to the first device; and sending the communication KPI corresponding to the first device to the first server.

In an implementation of the fourth aspect, the obtaining the communication KPI between the UPF and the first server according to the communication indicator measurement rule includes: determining a downlink communication KPI between the UPF and the first server according to the communication indicator measurement rule and the first downlink measurement packet, where the communication KPI between the UPF and the first server includes the downlink communication KPI between the UPF and the first server.

In an implementation of the fourth aspect, the first downlink measurement packet further carries time at which the first server receives the first uplink measurement packet, or transmission time of the first uplink measurement packet between the UPF and the first server; and the obtaining the communication KPI between the UPF and the first server according to the communication indicator measurement rule includes: determining an uplink communication KPI between the UPF and the first server according to the communication indicator measurement rule and the first downlink measurement packet, where the communication KPI between the UPF and the first server includes the uplink communication KPI between the UPF and the first server.

In an implementation of the fourth aspect, the first device is a target terminal device or a radio access network device, and obtaining the communication KPI corresponding to the first device based on the communication KPI between the UPF and the first server includes: obtaining a communication KPI between the first device and the UPF; and obtaining the communication KPI between the first device and the first server based on the communication KPI between the first device and the UPF and the communication KPI between the UPF and the first server.

In an implementation of the fourth aspect, the method further includes: sending an uplink measurement packet to the first server, where the uplink measurement packet carries the parameter, the parameter includes time at which the UPF sends the uplink measurement packet, and the uplink measurement packet is triggered by the first device.

In an implementation of the fourth aspect, the method further includes: receiving the uplink communication KPI between the UPF and the first server from the first server.

In an implementation of the fourth aspect, the parameter further includes a downlink parameter, and the downlink parameter includes time at which the UPF receives the first downlink measurement packet, or transmission time of the first downlink measurement packet between the UPF and the first server.

According to a fifth aspect, an embodiment of this application provides an information transmission method, applied to a first server and including: sending measurement indication information to a target terminal device, where the measurement indication information indicates to measure a communication KPI between the target terminal device and the first server; and receiving third information from the target terminal device, where the third information includes the communication KPI between the target terminal device and the first server, or a parameter for obtaining the communication KPI between the target terminal device and the first server.

In an implementation of the fifth aspect, when the third information includes the parameter for obtaining the communication KPI between the target terminal device and the first server, the method further includes: obtaining the communication KPI between the target terminal device and the first server based on the third information.

In an implementation of the fifth aspect, the measurement indication information includes: a measurement indication; or service description information, a to-be-measured communication KPI, and information about the first server; or a measurement indication, service description information, a to-be-measured communication KPI, and information about the first server, where the measurement indication indicates to measure the KPI between the target terminal device and the first server.

In an implementation of the fifth aspect, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In an implementation of the fifth aspect, the receiving third information from the target terminal device includes: receiving a first uplink measurement packet from the target terminal device, where the first uplink measurement packet carries the parameter, and the parameter includes time at which the target terminal device sends the first uplink measurement packet; and the method further includes: sending a first downlink measurement packet to the target terminal device, where the first downlink measurement packet carries time at which the first server sends the first downlink measurement packet.

In an implementation of the fifth aspect, the parameter further includes a downlink parameter, and the downlink parameter includes time at which the target terminal device receives the first downlink measurement packet, or transmission time of the first downlink measurement packet between the target terminal device and the first server; and the obtaining the communication KPI between the target terminal device and the first server based on the third information includes: obtaining a downlink communication KPI between the target terminal device and the first server based on the downlink parameter.

In an implementation of the fifth aspect, the obtaining the communication KPI between the target terminal device and the first server based on the third information includes: obtaining an uplink communication KPI between the target terminal device and the first server based on time at which the target terminal device sends the first uplink measurement packet.

In an implementation of the fifth aspect, the receiving third information from the target terminal device includes: receiving an uplink measurement packet from the target terminal device, where the uplink measurement packet carries the parameter, and the parameter includes time at which the target terminal device sends the uplink measurement packet; and the obtaining the communication KPI between the target terminal device and the first server based on the third information includes: determining an uplink communication KPI between the target terminal device and the first server based on the parameter.

In an implementation of the fifth aspect, the method further includes: sending the uplink communication KPI between the target terminal device and the first server to the target terminal device.

In an implementation of the fifth aspect, the first downlink measurement packet further carries time at which the first server receives the first uplink measurement packet, or transmission time of the first uplink measurement packet between the target terminal device and the first server.

In an implementation of the fifth aspect, the method further includes: sending the communication KPI between the target terminal device and the first server to an ECS, an EAS, or the target terminal device.

In an implementation of the fifth aspect, the method further includes: determining the target terminal device based on measurement configuration information, where the measurement configuration information includes at least one of a measurement area and application information.

In an implementation of the fifth aspect, the target terminal device is located in the measurement area; or the target terminal device is installed with an application corresponding to the application information; or the target terminal device is installed with an application corresponding to the application information, and the target terminal device is located in the measurement area.

In an implementation of the fifth aspect, before the determining the target terminal device based on measurement configuration information, the method further includes: receiving the measurement configuration information from a second server; or receiving the application information from a terminal device.

In an implementation of the fifth aspect, the method further includes: obtaining identification information of one or more terminal devices from the EAS, where the one or more terminal devices are terminal devices connected to the EAS; and
    determining a terminal device corresponding to the identification information of the one or more terminal devices as the target terminal device.

According to a sixth aspect, an embodiment of this application provides an information transmission method, including: receiving measurement indication information from a first server, where the measurement indication information indicates to measure a communication KPI between a target terminal device and the first server; and sending third information to the first server based on the measurement indication information, where the third information includes: the communication KPI between the target terminal device and the first server, or a parameter for obtaining the communication KPI between the target terminal device and the first server.

In an implementation of the sixth aspect, the measurement indication information includes: a measurement indication; or service description information, a to-be-measured communication KPI, and information about the first server; or a measurement indication, service description information, a to-be-measured communication KPI, and information about the first server, where the measurement indication indicates to measure the KPI between the target terminal device and the first server.

In an implementation of the sixth aspect, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In an implementation of the sixth aspect, the sending third information to the first server based on the measurement indication information includes: sending a first uplink measurement packet to the first server based on the measurement indication information, where the first uplink measurement packet carries the parameter, and the parameter includes time at which the target terminal device sends the first uplink measurement packet; and the method further includes: receiving a first downlink measurement packet from the first server, where the first downlink measurement packet carries time at which the first server sends the first downlink measurement packet.

In an implementation of the sixth aspect, the sending third information to the first server based on the measurement indication information includes: obtaining the communication KPI between the target terminal device and the first server based on the measurement indication information; and sending the communication KPI between the target terminal device and the first server to the first server.

In an implementation of the sixth aspect, the obtaining the communication KPI between the target terminal device and the first server based on the measurement indication information includes: determining a downlink communication KPI between the target terminal device and the first server based on the measurement indication information and the first downlink measurement packet, where the communication KPI between the target terminal device and the first server includes the downlink communication KPI between the target terminal device and the first server.

In an implementation of the sixth aspect, the first downlink measurement packet further carries time at which the first server receives the first uplink measurement packet, or transmission time of the first uplink measurement packet between the target terminal device and the first server; and the obtaining the communication KPI between the target terminal device and the first server based on the measurement indication information includes: determining an uplink communication KPI between the target terminal device and the first server based on the measurement indication information and the first downlink measurement packet, where the communication KPI between the target terminal device and the first server includes the uplink communication KPI between the target terminal device and the first server.

In an implementation of the sixth aspect, the sending third information to the first server based on the measurement indication information includes: sending an uplink measurement packet to the first server based on the measurement indication information, where the uplink measurement packet carries the parameter, and the parameter includes time at which the target terminal device sends the uplink measurement packet.

In an implementation of the sixth aspect, the method further includes: receiving an uplink communication KPI between the target terminal device and the first server from the first server.

In an implementation of the sixth aspect, the parameter further includes time at which the target terminal device receives the first downlink measurement packet, or transmission time of the first downlink measurement packet between the target terminal device and the first server.

According to a seventh aspect, an embodiment of this application provides an information transmission apparatus, including a sending unit and a receiving unit.

The sending unit is configured to send first information to a policy control function PCF, where the first information is for measuring a communication key performance indicator KPI corresponding to a first device.

The receiving unit is configured to receive second information from a user plane function UPF, where the second information includes the communication KPI corresponding to the first device, or a parameter for obtaining the communication KPI corresponding to the first device.

The communication KPI includes a communication KPI between the UPF and the first server.

In an implementation, when the second information includes the parameter for obtaining the communication KPI corresponding to the first device, the apparatus further includes a processing unit.

The processing unit is configured to obtain, based on the second information, the communication KPI corresponding to the first device.

In an implementation, the receiving unit is further configured to receive information about a target application.

The processing unit is configured to generate the first information based on the information about the target application.

In an implementation, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation, the first information includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

In an implementation, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In an implementation, the receiving unit is specifically configured to receive a first uplink measurement packet from the UPF, where the first uplink measurement packet carries the parameter, the parameter includes time at which the UPF sends the first uplink measurement packet, and the first uplink measurement packet is triggered by the first device; and the sending unit is further configured to send a first downlink measurement packet to the UPF, where the first downlink measurement packet carries time at which the first server sends the first downlink measurement packet, and a destination device of the first downlink measurement packet is the first device.

In an implementation, the processing unit is configured to: obtain a communication KPI between the UPF and the first server based on the second information; and obtain, based on the communication KPI between the UPF and the first server, the communication KPI corresponding to the first device.

In an implementation, the parameter further includes a downlink parameter, and the downlink parameter includes time at which the UPF receives the first downlink measurement packet, or transmission time of the first downlink measurement packet between the UPF and the first server; and the processing unit is specifically configured to obtain a downlink communication KPI between the UPF and the first server based on the downlink parameter.

In an implementation, the processing unit is specifically configured to obtain an uplink communication KPI between the UPF and the first server based on time at which the UPF sends the first uplink measurement packet.

In an implementation, the first device is a target terminal device or a radio access network device, and the processing unit is specifically configured to: obtain a communication KPI between the first device and the UPF; and obtain the communication KPI between the first device and the first server based on the communication KPI between the first device and the UPF and the communication KPI between the UPF and the first server.

In an implementation, the receiving unit is configured to receive an uplink measurement packet from the UPF, where the uplink measurement packet carries the parameter, the parameter includes time at which the UPF sends the uplink measurement packet, and the uplink measurement packet is triggered by the first device; and the processing unit is configured to determine an uplink communication KPI between the UPF and the first server based on the parameter.

In an implementation, the sending unit is further configured to send the uplink communication KPI between the UPF and the first server to the UPF.

In an implementation, the first downlink measurement packet further carries time at which the first server receives the first uplink measurement packet, or transmission time of the first uplink measurement packet between the UPF and the first server.

In an implementation, the sending unit is further configured to send the communication KPI corresponding to the first device to an ECS, an EAS, or the target terminal device.

In an implementation, the first device is the target terminal device, and the processing unit is further configured to determine the target terminal device based on measurement configuration information, where the measurement configuration information includes at least one of a measurement area and application information.

In an implementation, the target terminal device is located in the measurement area; or the target terminal device is installed with an application corresponding to the application information; or the target terminal device is installed with an application corresponding to the application information, and the target terminal device is located in the measurement area.

In an implementation, the receiving unit is further configured to: receive the measurement configuration information from a second server; or receive the application information from a terminal device.

In an implementation, the first device is the target terminal device, and the processing unit is further configured to: obtain identification information of one or more terminal devices from the EAS, where the one or more terminal devices are terminal devices connected to the EAS; and determine a terminal device corresponding to the identification information of the one or more terminal devices as the target terminal device.

According to an eighth aspect, an embodiment of this application provides an information transmission apparatus, including a sending unit and a receiving unit.

The receiving unit is configured to receive first information from a first server, where the first information is for measuring a communication key performance indicator KPI corresponding to a first device, and the communication KPI includes a communication KPI between a user plane function UPF and the first server.

The sending unit is configured to send a communication indicator measurement policy to a session management function SMF based on the first information, where the communication indicator measurement policy indicates to measure the communication KPI corresponding to the first device.

In an implementation, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation, the communication indicator measurement policy includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

According to a ninth aspect, an embodiment of this application provides an information transmission apparatus, including a sending unit and a receiving unit.

The receiving unit is configured to receive a communication indicator measurement policy from a policy control function PCF, where the communication indicator measurement policy indicates to measure a communication key performance indicator KPI corresponding to a first device.

The sending unit is configured to send a communication indicator measurement rule to a user plane function UPF according to the communication indicator measurement policy, where the communication indicator measurement rule is for measuring the communication KPI corresponding to the first device, and the communication KPI includes a communication KPI between the UPF and a first server.

In an implementation, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation, the communication indicator measurement rule includes the communication indicator measurement policy.

In an implementation, the communication indicator measurement policy includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

According to a tenth aspect, an embodiment of this application provides an information transmission apparatus, including a sending unit and a receiving unit.

The receiving unit is configured to receive a communication indicator measurement rule from a session management function SMF, where the communication indicator measurement rule is for measuring a communication key performance indicator KPI corresponding to a first device.

The sending unit is configured to send second information to a first server according to the communication indicator measurement rule, where the second information includes the communication KPI corresponding to the first device, or a parameter for obtaining the communication KPI corresponding to the first device.

The communication KPI includes a communication KPI between a UPF and the first server.

In some embodiments, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In some embodiments, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In some embodiments, the sending unit is specifically configured to send a first uplink measurement packet to the first server according to the communication indicator measurement rule, where the first uplink measurement packet carries the parameter, the parameter includes time at which the UPF sends the first uplink measurement packet, and the first uplink measurement packet is triggered by the first device; and the receiving unit is configured to receive a first downlink measurement packet from the first server, where the first downlink measurement packet carries time at which the first server sends the first downlink measurement packet, and a destination device of the first downlink measurement packet is the first device.

In some embodiments, the apparatus further includes a processing unit.

The processing unit is configured to: obtain the communication KPI between the UPF and the first server according to the communication indicator measurement rule; and obtain, based on the communication KPI between the UPF and the first server, the communication KPI corresponding to the first device.

The sending unit is configured to send the communication KPI corresponding to the first device to the first server.

In some embodiments, the processing unit is configured to determine a downlink communication KPI between the UPF and the first server according to the communication indicator measurement rule and the first downlink measurement packet, where the communication KPI between the UPF and the first server includes the downlink communication KPI between the UPF and the first server.

In some embodiments, the first downlink measurement packet further carries time at which the first server receives the first uplink measurement packet, or transmission time of the first uplink measurement packet between the UPF and the first server.

The processing unit is specifically configured to determine an uplink communication KPI between the UPF and the first server according to the communication indicator measurement rule and the first downlink measurement packet, where the communication KPI between the UPF and the first server includes the uplink communication KPI between the UPF and the first server.

In some embodiments, the first device is a target terminal device or a radio access network device, and the processing unit is specifically configured to: obtain the communication KPI between the first device and the UPF; and obtain the communication KPI between the first device and the first server based on the communication KPI between the first device and the UPF and the communication KPI between the UPF and the first server.

In some embodiments, the sending unit is configured to send an uplink measurement packet to the first server, where the uplink measurement packet carries the parameter, the parameter includes time at which the UPF sends the uplink measurement packet, and the uplink measurement packet is triggered by the first device.

In some embodiments, the receiving unit is configured to receive an uplink communication KPI between the UPF and the first server from the first server.

In some embodiments, the parameter further includes a downlink parameter, and the downlink parameter includes time at which the UPF receives the first downlink measurement packet, or transmission time of the first downlink measurement packet between the UPF and the first server.

According to an eleventh aspect, an embodiment of this application provides an information transmission apparatus, including a sending unit and a receiving unit.

The sending unit is configured to send measurement indication information to a target terminal device, where the measurement indication information indicates to measure a communication KPI between the target terminal device and a first server.

The receiving unit is configured to receive third information from the target terminal device, where the third information includes the communication KPI between the target terminal device and the first server, or a parameter for obtaining the communication KPI between the target terminal device and the first server.

In some embodiments, when the third information includes the parameter for obtaining the communication KPI between the target terminal device and the first server, the apparatus further includes a processing unit.

The processing unit is configured to obtain the communication KPI between the target terminal device and the first server based on the third information.

In some embodiments, the measurement indication information includes: a measurement indication; or service description information, a to-be-measured communication KPI, and information about the first server; or a measurement indication, service description information, a to-bemeasured communication KPI, and information about the first server, where the measurement indication indicates to measure the KPI between the target terminal device and the first server.

In some embodiments, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In some embodiments, the receiving unit is configured to receive a first uplink measurement packet from the target terminal device, where the first uplink measurement packet carries the parameter, and the parameter includes time at which the target terminal device sends the first uplink measurement packet; and the sending unit is configured to send a first downlink measurement packet to the target terminal device, where the first downlink measurement packet carries time at which the first server sends the first downlink measurement packet.

In some embodiments, the parameter further includes a downlink parameter, and the downlink parameter includes time at which the target terminal device receives the first downlink measurement packet, or transmission time of the first downlink measurement packet between the target terminal device and the first server; and the processing unit is specifically configured to obtain a downlink communication KPI between the target terminal device and the first server based on the downlink parameter.

In some embodiments, the processing unit is specifically configured to obtain an uplink communication KPI between the target terminal device and the first server based on time at which the target terminal device sends the first uplink measurement packet.

In some embodiments, the receiving unit is configured to receive an uplink measurement packet from the target terminal device, where the uplink measurement packet carries the parameter, and the parameter includes time at which the target terminal device sends the uplink measurement packet; and the processing unit is specifically configured to determine an uplink communication KPI between the target terminal device and the first server based on the parameter.

In some embodiments, the sending unit is further configured to send the uplink communication KPI between the target terminal device and the first server to the target terminal device.

In some embodiments, the first downlink measurement packet further carries time at which the first server receives the first uplink measurement packet, or transmission time of the first uplink measurement packet between the target terminal device and the first server.

In some embodiments, the sending unit is further configured to send the communication KPI between the target terminal device and the first server to an ECS, an EAS, or the target terminal device.

In some embodiments, the processing unit is further configured to determine the target terminal device based on measurement configuration information, where the measurement configuration information includes at least one of a measurement area and application information.

In some embodiments, the target terminal device is located in the measurement area; or the target terminal device is installed with an application corresponding to the application information; or the target terminal device is installed with an application corresponding to the application information, and the target terminal device is located in the measurement area.

In some embodiments, the receiving unit is further configured to: receive the measurement configuration information from a second server; or receive the application information from a terminal device.

In some embodiments, the processing unit is further configured to: obtain identification information of one or more terminal devices from the EAS, where the one or more terminal devices are terminal devices connected to the EAS; and determine a terminal device corresponding to the identification information of the one or more terminal devices as the target terminal device.

According to a twelfth aspect, an embodiment of this application provides an information transmission apparatus, including a sending unit and a receiving unit.

The receiving unit is configured to receive measurement indication information from a first server, where the measurement indication information indicates to measure a communication KPI between a target terminal device and the first server.

The sending unit is configured to send third information to the first server based on the measurement indication information.

The third information includes: the communication KPI between the target terminal device and the first server, or a parameter for obtaining the communication KPI between the target terminal device and the first server.

In some embodiments, the measurement indication information includes: a measurement indication; or service description information, a to-be-measured communication KPI, and information about the first server; or a measurement indication, service description information, a to-be-measured communication KPI, and information about the first server, where the measurement indication indicates to measure the KPI between the target terminal device and the first server.

In some embodiments, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In some embodiments, the sending unit is configured to send a first uplink measurement packet to the first server based on the measurement indication information, where the first uplink measurement packet carries the parameter, and the parameter includes time at which the target terminal device sends the first uplink measurement packet; and the receiving unit is configured to receive a first downlink measurement packet from the first server, where the first downlink measurement packet carries time at which the first server sends the first downlink measurement packet.

In some embodiments, the apparatus further includes a processing unit.

The processing unit is configured to obtain the communication KPI between the target terminal device and the first server based on the measurement indication information.

The sending unit is configured to send the communication KPI between the target terminal device and the first server to the first server.

In some embodiments, the processing unit is specifically configured to determine a downlink communication KPI between the target terminal device and the first server based on the measurement indication information and the first downlink measurement packet, where the communication KPI between the target terminal device and the first server includes the downlink communication KPI between the target terminal device and the first server.

In some embodiments, the first downlink measurement packet further carries time at which the first server receives the first uplink measurement packet, or transmission time of the first uplink measurement packet between the target terminal device and the first server.

The processing unit is specifically configured to determine an uplink communication KPI between the target terminal device and the first server based on the measurement indication information and the first downlink measurement packet, where the communication KPI between the target terminal device and the first server includes the uplink communication KPI between the target terminal device and the first server.

In some embodiments, the sending unit is further configured to send an uplink measurement packet to the first server based on the measurement indication information, where the uplink measurement packet carries the parameter, and the parameter includes time at which the target terminal device sends the uplink measurement packet.

In some embodiments, the receiving unit is configured to receive an uplink communication KPI between the target terminal device and the first server from the first server.

In some embodiments, the parameter further includes time at which the target terminal device receives the first downlink measurement packet, or transmission time of the first downlink measurement packet between the target terminal device and the first server.

According to a thirteenth aspect, an embodiment of this application provides an information transmission apparatus. The information transmission apparatus may be a first server, a PCF, an SMF, a UPF, and a target terminal device, or may be a component (for example, an integrated circuit or a chip) of the first server, the PCF, the SMF, the UPF, and the target terminal device. The information transmission apparatus may implement functions corresponding to the steps in the methods in the first aspect to the twelfth aspect. The functions may be implemented by hardware, or may be implemented by hardware by executing corresponding software. The hardware or the software includes one or more units or modules corresponding to the foregoing functions.

In a possible design, the apparatus includes a processor. The processor is configured to support the apparatus in executing the corresponding functions in the methods in the foregoing aspects. The apparatus may further include a memory. The memory is configured to be coupled to the processor, and the memory stores program instructions and data that are necessary for the apparatus. Optionally, the apparatus further includes a transceiver. The transceiver is configured to support communication between the apparatus and another network element. The transceiver may be an independent receiver, an independent transmitter, or a transceiver integrating a sending function and a receiving function.

According to a fourteenth aspect, an embodiment of this application provides a communication device. The communication device includes a processor and a transceiver. The processor and the transceiver are configured to implement the information transmission method according to any one of the first aspect to the twelfth aspect.

According to a fifteenth aspect, an embodiment of this application further provides a chip, including a processor. The processor is configured to run a computer program, to enable an electronic device installed with the chip to perform the information transmission method according to any one of the first aspect to the twelfth aspect.

According to a sixteenth aspect, an embodiment of this application provides a computer storage medium. The storage medium includes computer instructions. When the instructions are executed by a computer, the computer is enabled to implement the information transmission method according to any one of the first aspect to the twelfth aspect.

According to a seventeenth aspect, an embodiment of this application provides a computer program product. The program product includes a computer program, the computer program is stored in a readable storage medium, at least one processor of a communication device may read the computer program from the readable storage medium, and the at least one processor executes the computer program, to enable the communication device to implement the information transmission method according to any one of the first aspect to the twelfth aspect.

According to an eighteenth aspect, an embodiment of this application provides a communication system. The system includes the foregoing first server, PCF, SMF, and UPF.

According to a nineteenth aspect, an embodiment of this application provides a communication system. The system includes the foregoing first server and target terminal device.

According to the information transmission method and apparatus, and the storage medium provided in the embodiments of this application, a first server sends first information to a PCF, where the first information is for measuring a communication KPI corresponding to a first device, and the communication KPI includes a communication KPI between a UPF and the first server. The PCF sends a communication indicator measurement policy to an SMF based on the first information. The SMF sends a communication indicator measurement rule to the UPF according to the communication indicator measurement policy, where the communication indicator measurement rule is for measuring the communication KPI corresponding to the first device. The UPF sends second information to the first server according to the communication indicator measurement rule, where the second information includes the communication KPI corresponding to the first device, or a parameter for obtaining the communication KPI corresponding to the first device. In this way, the first server may obtain the KPI between the UPF and the first server based on the second information, so that the KPI between the UPF and the first server is measured. In a subsequent process of selecting the first server, the first server may be selected based on the KPI between the UPF and the first server, so that the selected first server better meets a KPI requirement of a user, thereby improving user experience.

DETAILED DESCRIPTION OF ILLUSTRATIVE EMBODIMENTS

The following describes the technical solutions in embodiments of this application with reference to the accompanying drawings in embodiments of this application.

It should be understood that in embodiments of this application, "B corresponding to A" indicates that B is associated with A. In an implementation, B may be determined based on A. However, it should be further understood that determining B based on A does not mean that B is determined based only on A. B may alternatively be determined based on A and/or other information. The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

In the specification, claims, and accompanying drawings of the present invention, the terms such as "first" and "second" distinguish between same items or similar items whose functions and effects are basically the same. A person skilled in the art may understand that the terms such as "first" and "second" do not limit a quantity or an execution sequence, and the terms such as "first" and "second" do not indicate a definite difference.

In the specification, claims, and accompanying drawings of the present invention, the terms "have", "may have", "include", and "may include" indicate existence of corresponding features (for example, values, functions, operations, or some elements), and do not exclude existence of additional features.

The technical solutions in embodiments of this application may be applied to a plurality of communication systems, for example, a 2G, 3G, 4G, 5G communication system, or a next generation communication system, for example, a global system for mobile communications (GSM), a code division multiple access (CDMA) system, time division multiple access (TDMA) system, a wideband code division multiple access (WCDMA) system, a frequency division multiple access (FDMA) system, an orthogonal frequency division multiple access (OFDMA) system, a single-carrier FDMA (SC-FDMA) system, a general packet radio service (GPRS) system, a long term evolution (LTE) system, and a new radio (NR) communication system.

Figure 1:
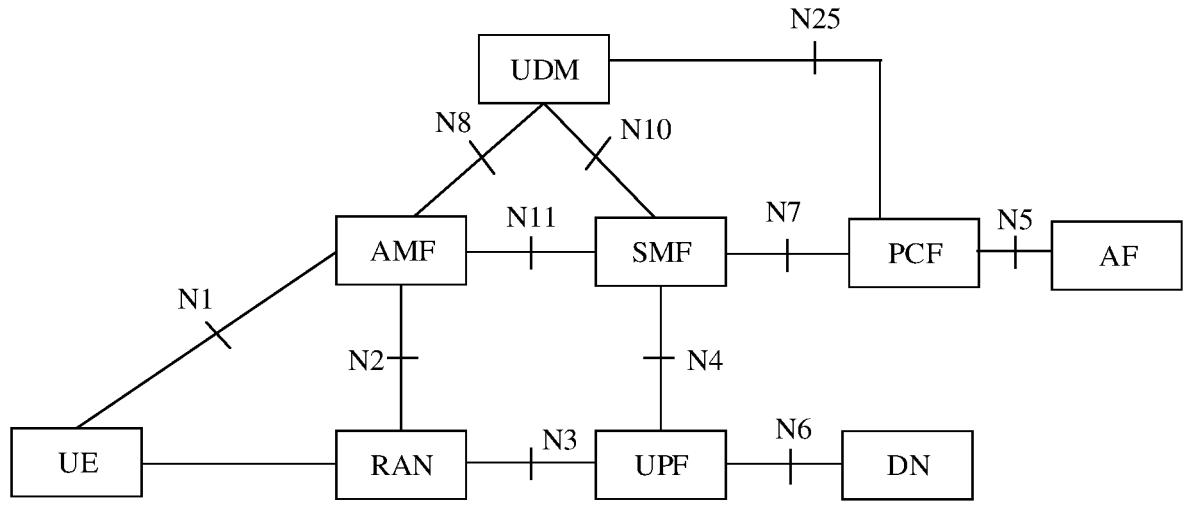
FIG. 1 is a diagram of a 5G communication system according to an embodiment of this application.

FIG. 1 is a diagram of a 5G communication system according to an embodiment of this application. As shown in FIG. 1, the diagram of the 5G communication system includes an access network and a core network. The access network is used to implement a function related to radio access. The core network mainly includes the following key logical network elements: a radio access network ((R)AN), an access and mobility management function (AMF), a session management function (SMF), a user plane function (UPF), a policy control function (PCF), and a unified data management (UDM).

Terminal device: The terminal device may be a wireless terminal device or a wired terminal device. The wireless terminal device may be a device having a wireless transceiver function, and may be deployed on land, including an indoor device, an outdoor device, a handheld device, or a vehicle-mounted device; or may be deployed on a water surface (for example, on a ship); or may be deployed in the air (for example, on an airplane, a balloon, or a satellite). The terminal device may be a mobile phone, a tablet (Pad), a computer having a wireless transceiver function, a virtual reality (VR) terminal device, an augmented reality (AR) terminal device, a wireless terminal device in industrial contro, a wireless terminal device in self driving, a wireless terminal device in remote medical, a wireless terminal device in a smart grid, a wireless terminal device in transportation safety, a wireless terminal device in a smart city, a wireless terminal device in a smart home, or the like. This is not limited herein. It may be understood that, in embodiments of this application, the terminal device may also be referred to as user equipment (UE).

A RAN is a device that provides radio access for a terminal device and includes but is not limited to a gNB, a transmission reception point (TRP), an evolved NodeB (eNB), a radio network controller (RNC), a NodeB (NB), a base station controller (BSC), a base transceiver station (base transceiver station, BTS), a home base station (for example, a home evolved NodeB, or a home NodeB, HNB), a baseband unit (BBU), a wireless fidelity (Wi-Fi) access point (AP), or the like.

The AMF is mainly responsible for mobility management in the mobile network, such as user location update, registration of a user with a network, and user switching.

The SMF is mainly responsible for session management in the mobile network, such as session establishment, modification, and release. For example, specific functions are allocation of an IP address to a user and selection of a UPF that provides a packet forwarding function.

The PCF provides policies, such as QoS policies and slice selection policies, for the AMF and the SMF.

The UDM is configured to store user data such as subscription information and authentication/authorization information.

The AF (application function) is responsible for providing a service for a 3GPP network, for example, affecting service routing, and interacting with the PCF to perform policy control.

The UPF is mainly responsible for processing a user packet, such as forwarding and charging.

The DN is a network that provides a data transmission service for a user, such as an IMS (IP multimedia service), or the Internet. The DN can have a plurality of application servers.

In the 5G communication system shown in FIG. 1, a terminal device accesses a data network (DN) by establishing a session (PDU session) from the terminal device to the RAN, the UPF, and the DN.

Figure 2:
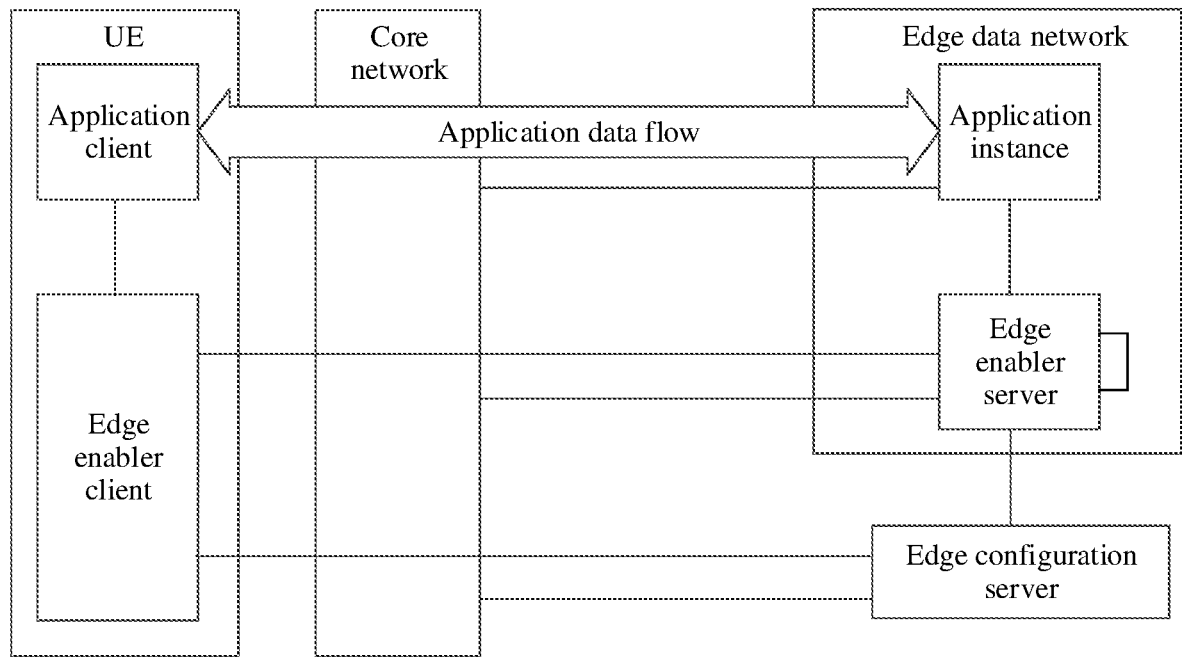
FIG. 2 is a schematic diagram of an EDGE application architecture according to an embodiment of this application.

FIG. 2 is a schematic diagram of an application architecture according to an embodiment of this application. As shown in FIG. 2, the application architecture includes the following network elements:

Enhanced data rate for GSM evolution (EDGE) is a transition technology from GSM to 3G. It uses a new modulation method in a GSM system, that is, the most advanced multislot operation and 8PSK modulation technology.

Edge data network (EDN): edge data network. In a general understanding, an EDN corresponds to only one data network and is a special local data network (local DN). The EDN contains an edge enabling function, can be identified by a DNAI and a DNN, and is a network logical concept. In another understanding of the EDN, the EDN is a peer concept of a central cloud. The EDN can be understood as a local data center (geographical location concept), can be identified by a DNAI, and may include a plurality of local data networks (local DNs).

Application instance/Edge application: An application deployed on an edge data network is referred to as an application instance. The application instance specifically refers to an instance of a server application program (for example, social media software, augmented reality (AR), or virtual reality (VR)) deployed and run on the EDN. One or more EASs can be deployed for an application on one or more EDNs. The EASs deployed on different EDNs can be considered as different EASs of an application. The EASs can share a domain name, use an anycast IP address, or use different IP addresses. The EAS may also be referred to as an edge application (server), an application instance, an edge application instance, an MEC application (server), an EAS function, or the like.

Application client: A peer entity of the edge application on the UE side. The application client is used by an application user to obtain an application service from an application server. The application client is a client program of an application on a terminal side. The application client may be connected to an application server on a cloud to obtain an application service, or may be connected to EASs deployed and run on one or more EDNs to obtain an application service.

Edge enabler server (EES): The edge enabler server may provide some enabling capabilities for application instances deployed on the EDN, to better support application deployment in the MEC. The edge enabler server may support registration of an edge application, and authorization and authentication of the UE, and provide IP address information of an application instance for the UE. The edge enabler server may further support obtaining of an identifier and IP address information of an application instance, and further send the identifier and the IP address information of the application instance to an edge data network configuration server. The EES is deployed in the EDN. Generally, an EAS is registered with an EES, or information about an EAS is configured on an EES through a management system. The EES is referred to as an EES associated with the EAS. The EES controls/manages the EAS registered with/configured on the EES.

Edge enabler client (EEC): The Edge enabler client is a peer entity of the EES on the UE side. The EEC is configured to: register information about the EEC and information about an application client with the EES, perform security authentication and authorization, obtain an EAS IP address from the EES, and provide an edge computing enabler capability for the application client. For example, the EEC uses an EAS discovery service to return an EAS IP address to the application client. The EEC can also invoke a service interface provided by the EDN CC.

Edge configuration server (ECS): The edge configuration server configures the EDN, for example, provides EES information for the UE. Alternatively, the edge configuration server may directly provide the information about the application instance to the UE, and obtain the information about the application instance by interacting with the DNS of the application. Further, the information about the application instance and the IP address is obtained from another functional entity and stored. In a current standard, functions of the ECS are integrated into those of an EEC entity.

An application user signs a service agreement with a provider of an application, to provide a service for the application user. The application user logs in to the application client on the terminal, and performs communication by using a connection between the application client and the EAS. An enabler client (for example, the EEC or the EDN CC) is a middleware layer, and is generally located in an operating system, or is located in middleware between the application client and the operating system. The application client may obtain an edge enabling service from the enabler client through an application programming interface (API).

Figure 3:
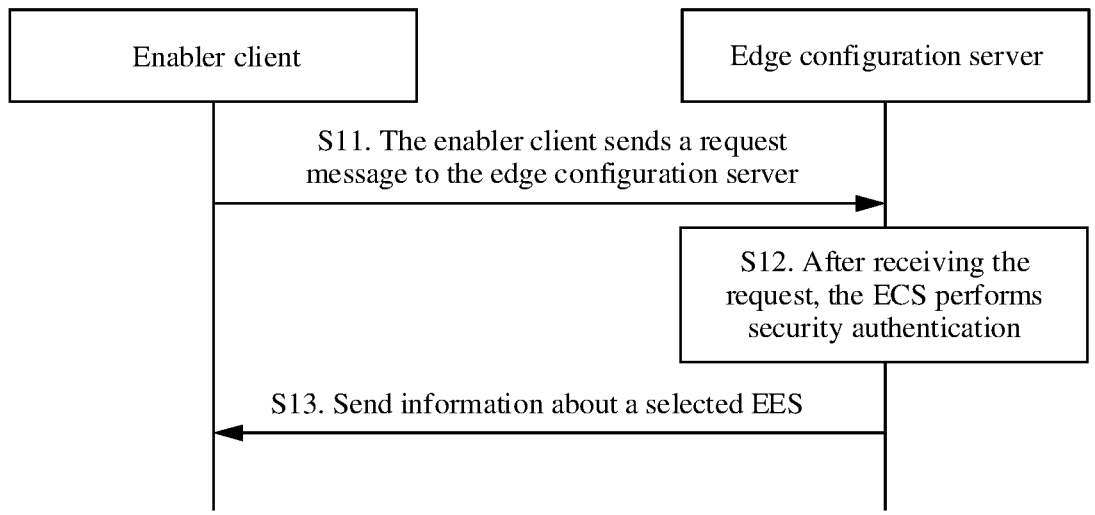
FIG. 3 is a schematic diagram of an EES platform discovery process according to an embodiment of this application.

FIG. 3 is a schematic diagram of an EES platform discovery process according to an embodiment of this application. As shown in FIG. 3, the EES platform discovery process includes the following steps.

S11. An enabler client sends a request message to an edge configuration server.

The request message is for obtaining EES information.
The request message is as shown in Table 1:

TABLE 1

Request message

| Information element | Status | Description |
| --- | --- | --- |
| Enabler client identifier EEC ID | Mandatory M | Identifier uniquely identifying an EEC |
| Security credential | Mandatory M | Security credential indicating successful authentication and authorization |
| Configuration information of an application client | Mandatory M | Service information connected to the EEC |
| UE identifier | Optional O | UE identifier, such as a GPSI or a token |
| Connection filter | Optional O | Connection information of a group of UEs, such as a PLMN ID or an SSID |

S12. After receiving the request, the ECS performs security authentication.

After the authentication succeeds, the ECS selects, based on parameters (such as information about an application client) in the request message, an EES that meets conditions.

S13: The ECS sends information about the selected EES to the EEC.

The information about the EES includes access information of the EES, for example, an IP address, DNN information, and information about a vendor to which the EES belongs.

TABLE 2

Information about an application client

| Information element | Status | Description |
| --- | --- | --- |
| Identifier of the application client | Mandatory M | Identifier for identifying the application client |
| Application provider | Optional O | Service provider that provides applications |
| Application | Optional O | Application description, human-readable |
| Application feature | Optional O | Application feature |
| > Geographical locations for running | Optional O | Physical area where the application client is located |
| > Delay | Optional O | Round trip time RTT (round trip time) required by an application, measured in milliseconds |

TABLE 2-continued

Information about an application client

| Information element | Status | Description |
| --- | --- | --- |
| > Bandwidth | Optional O | Bandwidth required by an application, measured in kbit/s |
| > Service continuity | Optional O | Service continuity mode required by an application, such as required, not required, application service continuity, and session continuity. |

Figure 4:
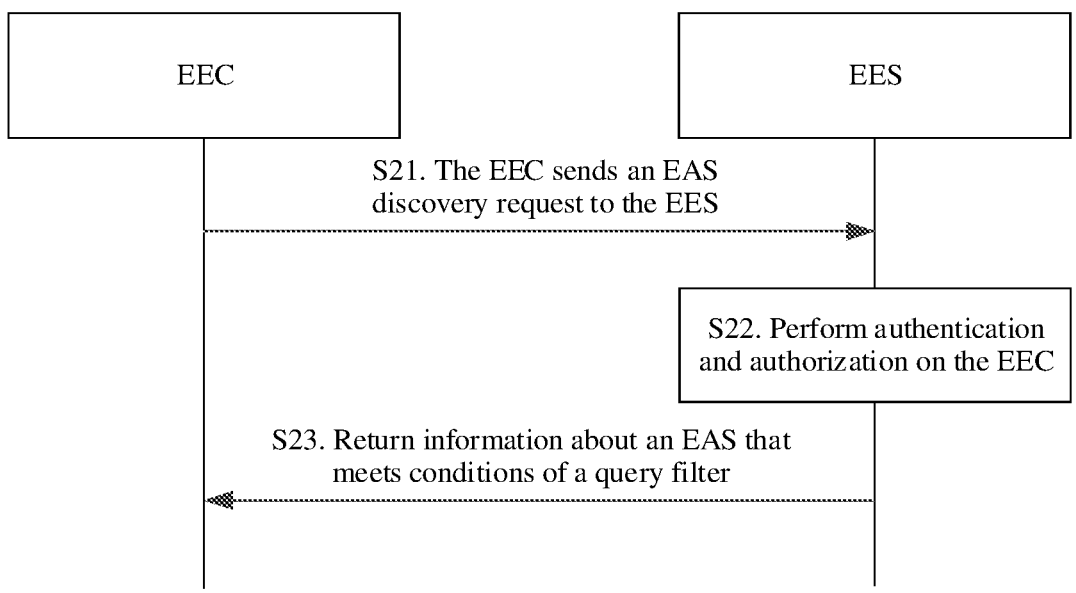
FIG. 4 is a schematic diagram of an EAS instance discovery process according to an embodiment of this application.

After the EES is determined according to S11 to S13, the EAS is discovered according to a method shown in FIG. 4.

FIG. 4 is a schematic diagram of an EAS instance discovery process according to an embodiment of this application. As shown in FIG. 4, the EAS instance discovery process includes the following steps.

S21: An EEC sends an EAS discovery request to an EES.

The request may carry a query filter for searching for a specific EAS or a specific type of EAS (such as a game). The query filter may also indicate a requested service level (such as a measurement version or a gold card level), a required application feature (such as a multiplayer game), or a specific available location.

S22: After receiving the request, the EES performs authentication and authorization on the EEC.

After the authentication and authorization succeed, the EES searches, by using the query filter, for an EAS that meets conditions and information about the EAS.

S23: The EES returns, to the EEC, the information about the EAS that meets the conditions of the query filter.

The information about the EAS includes access information (such as an IP address or a URL) of the EAS.

It can be learned from FIG. 3 and FIG. 4 that currently, when an EES is selected, a communication KPI between a UPF and the EES is not considered, and consequently the selected EES may not meet a KPI requirement of a user. In this case, when the UE performs EAS discovery with the selected EES, the UE may fail to obtain the EAS because the EES and an EAS of an EDN in which the EES is located cannot provide a KPI meeting the UE request. As a result, the UE cannot connect to any EAS. Alternatively, the EES can provide only an EAS whose KPI is lower than the KPI requested by the user. As a result, the user service experience deteriorates, and even the service cannot be normally performed.

To resolve the foregoing technical problem, an embodiment of this application provides an information transmission method. A first server sends first information to a PCF, where the first information is for measuring a communication KPI corresponding to a first device, and the communication KPI includes a communication KPI between a UPF and the first server. The PCF sends a communication indicator measurement policy to an SMF based on the first information. The SMF sends a communication indicator measurement rule to the UPF according to the communication indicator measurement policy, where the communication indicator measurement rule is for measuring the communication KPI corresponding to the first device. The UPF sends second information to the first server according to the communication indicator measurement rule, where the second information includes the communication KPI corresponding to the first device, or a parameter for obtaining the communication KPI corresponding to the first device. The first server obtains the KPI between the UPF and the first server based on the second information.

Some embodiments are used below to describe in detail the technical solutions in embodiments of this application. The following several embodiments may be combined with each other, and a same or similar concept or process may not be described repeatedly in some embodiments.

Figure 5:
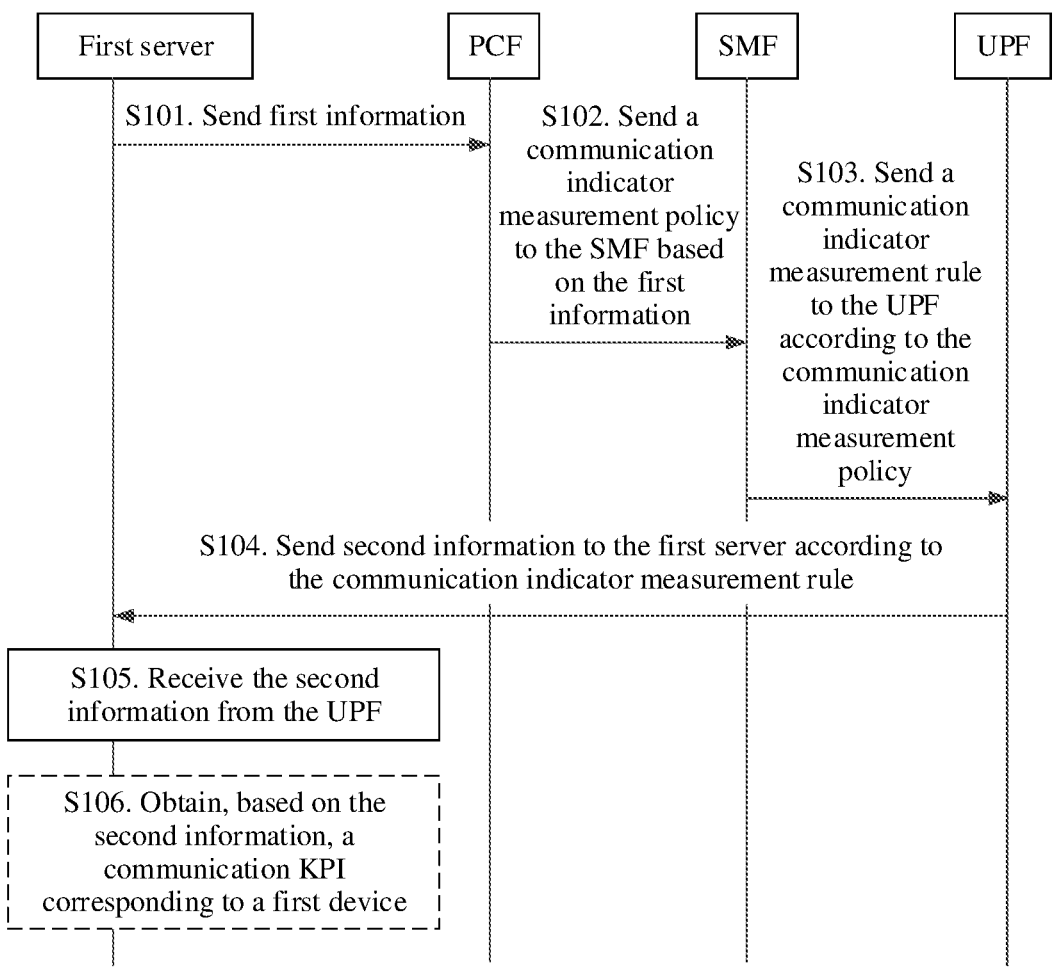
FIG. 5 is a schematic flowchart of an information transmission method according to an embodiment of this application.

FIG. 5 is a schematic flowchart of an information transmission method according to an embodiment of this application. As shown in FIG. 5, the method includes the following steps.

S101: A first server sends first information to a PCF.

The first information is for measuring a communication KPI corresponding to a first device.

The first server in this embodiment of this application may be the EES shown in FIG. 2, or may be another server located in a data network, for example, a slice enabler server configured to provide a slice enabling service for a third party, a video enabler server configured to provide a video enabling service for a video application, an internet of vehicles enabler server configured to provide an internet of vehicles enabling service for an internet of vehicles application, and a factory application enabler server configured to provide a factory enabling service for a factory application.

The communication KPI in this embodiment of this application includes at least one of the following: an uplink communication KPI, a downlink communication KPI, or a round trip delay.

The uplink communication KPI includes at least one of the following: a maximum uplink delay, a minimum uplink delay, an average uplink delay, a maximum uplink jitter, a minimum uplink jitter, and an average uplink jitter.

The downlink communication KPI includes at least one of the following: a maximum downlink delay, a minimum downlink delay, an average downlink delay, a maximum downlink jitter, a minimum downlink jitter, and an average downlink jitter.

The round trip delay includes at least one of the following: a maximum round trip delay, a minimum round trip delay, and an average round trip delay.

In this embodiment of this application, the first device may be a target terminal device, a radio access network device, a UPF, or the like.

In some embodiments, when the first device is the target terminal device or the radio access network device, the communication KPI includes a communication KPI between the first device and the UPF, and a communication KPI between the UPF and the first server.

In some embodiments, when the first device is the target terminal device, the communication KPI includes a communication KPI between the first device and the radio access network, a communication KPI between the radio access network and the UPF, and a communication KPI between the UPF and the first server.

The parameter for obtaining the communication KPI corresponding to the first device may include time information for obtaining the communication KPI corresponding to the first device. For example, the parameter includes time at which the UPF receives a downlink measurement packet, or transmission time of the downlink measurement packet between the UPF and the first server. The transmission time is a difference between the time at which the UPF receives the downlink measurement packet and time at which the first server sends the downlink measurement packet. For another example, the parameter includes time at which the UPF sends an uplink measurement packet.

In this embodiment of this application, content included in the first information includes but is not limited to the following several examples:

Example 1: The first information includes a measurement indication, where the measurement indication indicates to measure a communication KPI between the first device and the first server, or the measurement indication indicates to measure the communication KPI between the UPF and the first server.

Example 2: The first information includes service description information, a to-be-measured communication KPI, and information about the first server.

The service description information includes a 5G quality of service indicator (5G QoS indicator, 5QI) or a service data flow template (service Data Flow template, SDFT). The 5QI indicates an identifier of a QoS processing feature received when a QoS flow indicated by a quality of service (QoS) rule is processed in a 5G system. A value of the 5QI may be specified in the standard or optionally selected by an SMF.

The information about the first server includes an address of the first server and/or a port number of the first server.

The to-be-measured communication KPI includes a delay and/or a jitter between the first device and the first server or between the UPF and the first server.

Example 3: The first information includes a measurement indication, service description information, a to-be-measured communication KPI, and information about the first server.

Optionally, in some instances, the first information may further include at least one of the following: a measurement number, measurement start time and measurement end time, a total quantity of measurement packets, a size of a measurement packet, a protocol type (for example, a user datagram protocol (UDP), a transmission control protocol (TCP), or an industrial ethernet protocol (non-IP/Ethernet)) of the measurement packet, a packet sending frequency, and the like.

In some embodiments, before S101, the method in this embodiment of this application may further include: The first server receives information about a target application; and generates the first information based on the information about the target application.

The information about the target application includes an identifier of an application, a service description of the application, or the like.

It should be noted that the target application may be a first application, or may be a second application different from the first application. For example, the first application is an iQIYI application, and the second application is a Tencent video application.

S102: The PCF sends a communication indicator measurement policy to an SMF based on the first information.

The communication indicator measurement policy indicates to measure the communication KPI corresponding to the first device.

Optionally, the communication indicator measurement policy may be carried in a QoS policy sent by the PCF to the SMF.

In some instances, the communication indicator measurement policy may include a measurement indication, and the measurement indication indicates to measure the communication KPI corresponding to the first device.

In an example, if the first device is the UPF, the measurement indication may include an N6 interface measurement indication, and the N6 interface is a communication interface between the UPF and the first server. The N6 interface measurement indication indicates to measure the communication KPI between the UPF and the first server.

In another example, if the first device is the target terminal device or the radio access network device, the measurement indication may include an N6 interface measurement indication and a QoS measurement indication. The N6 interface measurement indication indicates to measure the communication KPI between the UPF and the first server, and the QoS measurement indication indicates to measure the communication KPI between the first device and the UPF. Alternatively, the measurement indication may include an end-to-end measurement indication that indicates to measure the communication KPI between the first device and the first server. The end-to-end measurement indication indicates to measure the communication KPI between the first device and the UPF and the communication KPI between the UPF and the first server.

In another example, if the first device is the terminal device or the radio access network device, the measurement indication may include a measurement parameter, and the measurement parameter indicates to measure the communication KPI between the first device and the first server.

In some embodiments, the communication indicator measurement policy may include a 5QI, a to-be-measured communication KPI, and information about the first server.

In some embodiments, the communication indicator measurement policy may include a measurement indication, a 5QI, a to-be-measured communication KPI, and information about the first server.

In some embodiments, the communication indicator measurement policy may further include: a measurement number, measurement start time and measurement end time, a total quantity of measurement packets, a size of a measurement packet, a protocol type (for example, a UDP, a TCP, or non-IP/Ethernet) of the measurement packet, a packet sending frequency, and the like.

It should be noted that the communication indicator measurement policy in this step may be different from a requirement and a format of a communication interface that the first information complies with. Specifically, the first information meets a communication requirement and a format of an N5 interface, the N5 interface is a communication interface between the first server and the PCF, and the first server sends the first information to the PCF through the N5 interface. The communication indicator measurement policy meets a communication requirement and a format of an N7 interface. The N7 interface is a communication interface between the PCF and the SMF. The PCF sends the communication indicator measurement policy to the SMF through the N7 interface.

S103. The SMF sends a communication indicator measurement rule to the UPF according to the communication indicator measurement policy.

The communication indicator measurement rule is for measuring the communication KPI corresponding to the first device.

Optionally, the communication indicator measurement rule may be carried in a QoS rule determined by the SMF and sent to the UPF.

In some examples, the communication indicator measurement rule includes a measurement indication, and the measurement indication indicates to measure the communication KPI corresponding to the first device.

In an example, if the first device is the UPF, the measurement indication may include an N6 interface measurement indication, and the N6 interface is a communication interface between the UPF and the first server. The N6 interface measurement indication indicates to measure the communication KPI between the UPF and the first server.

In another example, if the first device is the target terminal device or the radio access network device, the measurement indication may include an N6 interface measurement indication and a QoS measurement indication. The N6 interface measurement indication indicates to measure the communication KPI between the UPF and the first server, and the QoS measurement indication indicates to measure the communication KPI between the first device and the UPF. Alternatively, the measurement indication may include an end-to-end measurement indication that indicates to measure the communication KPI between the first device and the first server. The end-to-end measurement indication indicates to measure the communication KPI between the first terminal device and the UPF and the communication KPI between the UPF and the first server.

In another example, if the first device is the target terminal device or the radio access network device, the measurement indication may include a measurement parameter, and the measurement parameter indicates to measure the communication KPI between the first device and the first server.

In some embodiments, the communication indicator measurement rule may include a 5QI, a to-be-measured communication KPI, and information about the first server.

In some embodiments, the communication indicator measurement rule may include a measurement indication, a 5QI, a to-be-measured communication KPI, and information about the first server.

In some embodiments, the communication indicator measurement rule may further include a measurement number, measurement start time and measurement end time, a total quantity of measurement packets, a size of a measurement packet, a protocol type (for example, a UDP, a TCP, or non-IP/Ethernet) of the measurement packet, a packet sending frequency, and the like.

It should be noted that the communication indicator measurement rule in this step meets a requirement and a format of an N4 interface. The N4 interface is a communication interface between the SMF and the UPF. The SMF sends the communication indicator measurement rule to the UPF through the N4 interface.

After the foregoing steps S102 and S103, a QoS flow for measurement may be created, and subsequently a measurement packet may be transmitted between a terminal device and the UPF by using the QoS flow. The measurement packet may be a data packet of a service that is being performed by a specific application on a terminal, or a data packet exchanged between the terminal and the first server for measuring a communication KPI. A payload part of the data packet does not need to have a practical meaning. The measurement packet includes all uplink and downlink measurement packets measured during a measurement period.

S104: The UPF sends second information to the first server according to the communication indicator measurement rule.

In some cases, the second information includes the communication KPI corresponding to the first device.

In this case, if the first device is the UPF, the communication KPI corresponding to the first device includes the communication KPI between the UPF and the first server. If the first device is the target terminal device or the radio access network device, the communication KPI corresponding to the first device includes the communication KPI between the first device and the first server, or the communication KPI between the UPF and the first server.

For specific content of the communication KPI, refer to the descriptions of S101. For example, the communication KPI includes at least one of the following: an uplink communication KPI, a downlink communication KPI, or a round trip delay.

In some other cases, the second information includes a parameter for obtaining the communication KPI corresponding to the first device.

In this case, in an example, the parameter for obtaining the communication KPI corresponding to the first device may include time at which the UPF receives a downlink measurement packet, or transmission time of the downlink measurement packet between the UPF and the first server. The transmission time is a difference between time at which the UPF receives the downlink measurement packet and time at which the first server sends the downlink measurement packet.

In another example, the parameter for obtaining the communication KPI corresponding to the first device may include time at which the UPF sends an uplink measurement packet.

S105: The first server receives the second information from the UPF.

It can be learned from S104 that the second information carries different content in different cases.

In a first case, when the second information carries the communication KPI corresponding to the first device, the first server may directly obtain the communication KPI corresponding to the first device from the second information. The communication KPI corresponding to the first device includes the communication KPI between the UPF and the first server.

In a second case, when the second information carries the parameter for obtaining the communication KPI corresponding to the first device, this embodiment of this application further includes the following step S106:

S106: The first server obtains, based on the second information, the communication KPI corresponding to the first device.

Specifically, when the second information carries the parameter for obtaining the communication KPI corresponding to the first device, the first server obtains the communication KPI corresponding to the first device based on the parameter that is for obtaining the communication KPI corresponding to the first device and that is carried in the second information. For example, when the parameter includes the time at which the UPF receives the downlink measurement packet, the first server obtains a downlink communication KPI between the UPF and the first server based on the time at which the UPF receives the downlink measurement packet and the time at which the first server sends the downlink measurement packet. When the parameter includes the transmission time of the downlink measurement packet between the UPF and the first server, the first server obtains a downlink communication KPI between the UPF and the first server based on the transmission time. For another example, when the parameter includes the time at which the UPF sends the uplink measurement packet, the first server obtains an uplink communication KPI between the UPF and the first server based on the time at which the UPF sends the uplink measurement packet and the time at which the first server receives the uplink measurement packet.

In this embodiment of this application, according to the foregoing steps, the first server obtains the communication KPI corresponding to the first device, where the communication KPI corresponding to the first device includes the communication KPI between the UPF and the first server, so that a technical problem that the communication KPI between the UPF and the first server cannot be obtained currently is resolved.

According to the information transmission method provided in this embodiment of this application, the first server sends the first information to the PCF, where the first information is for measuring the communication KPI corresponding to the first device, and the communication KPI includes the communication KPI between the UPF and the first server. The PCF sends the communication indicator measurement policy to the SMF based on the first information. The SMF sends a communication indicator measurement rule to the UPF according to the communication indicator measurement policy, where the communication indicator measurement rule is for measuring the communication KPI corresponding to the first device. The UPF sends the second information to the first server according to the communication indicator measurement rule, where the second information includes the communication KPI corresponding to the first device, or the parameter for obtaining the communication KPI corresponding to the first device. In this way, the first server may obtain the KPI between the UPF and the first server based on the second information, to measure the KPI between the UPF and the first server. In a subsequent EES selection process, the first server may be selected based on the KPI between the UPF and the first server, so that a selected EES better meets a KPI requirement of a user, and user experience is improved.

In some embodiments, after that the first server obtains, according to the foregoing steps, the communication KPI corresponding to the first device, the method further includes step A:

Step A: The first server sends the communication KPI corresponding to the first device to an ECS, an EAS, or the target terminal device.

In this way, in a subsequent EES selection process, the ECS, the EAS, or the target terminal device may select an EES based on the communication KPI corresponding to the first device, so that the selected EES better meets a KPI requirement of the user. When the UE and the selected EES perform EAS discovery, an EAS that meets a KPI requirement of the user may be provided for the user to improve service experience of the user.

With reference to a specific example, the following describes in detail a process in which the first server obtains the communication KPI corresponding to the first device in the embodiments of this application.

Manner 1: The UPF determines the KPI corresponding to the first device.

Figure 6:
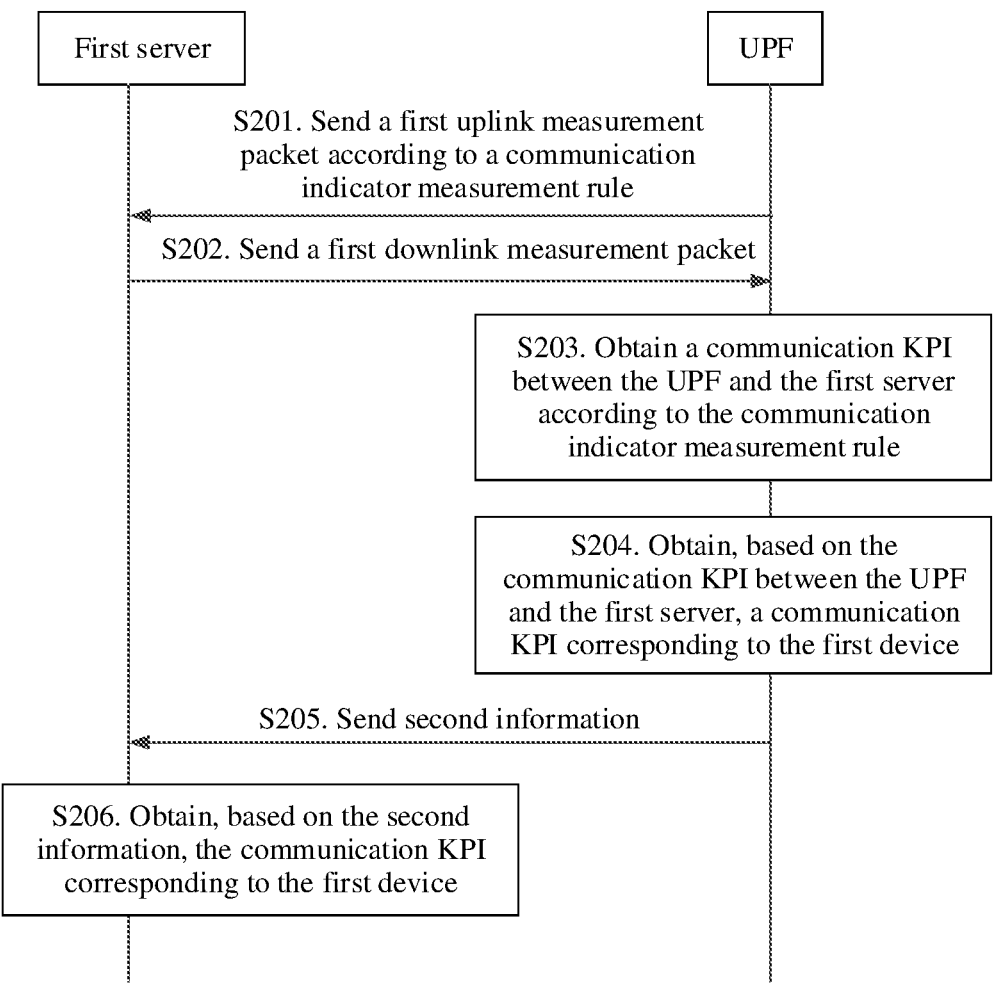
FIG. 6 is a schematic flowchart of an information transmission method according to an embodiment of this application.

FIG. 6 is a schematic flowchart of an information transmission method according to an embodiment of this application. As shown in FIG. 6, the method in this embodiment includes the following steps.

S201: A UPF sends a first uplink measurement packet to a first server according to a communication indicator measurement rule.

The first uplink measurement packet carries a parameter for obtaining a communication KPI corresponding to a first device. The parameter includes time at which the UPF sends the first uplink measurement packet. The first uplink measurement packet is triggered by the first device. In other words, it may be understood that a source of the first uplink measurement packet is the first device.

Specifically, after receiving the first uplink measurement packet, the UPF includes, according to the communication indicator measurement rule, the time at which the UPF sends the first uplink measurement packet in the first uplink measurement packet, and sends the first uplink measurement packet to the first server. Optionally, the UPF may include time at which the UPF sends the first uplink measurement packet in a header of the first uplink measurement packet, or include the time in a payload of the first uplink measurement packet.

In this embodiment, the foregoing second information sent by the UPF to the first server may be understood as the first uplink measurement packet.

If the first device is a target terminal device or a radio access network device, the UPF receives the first uplink measurement packet from the first device, includes the time at which the UPF receives the first uplink measurement packet in the first uplink measurement packet, and sends the first uplink measurement packet to the first server.

S202: The first server sends a first downlink measurement packet to the UPF.

The first downlink measurement packet carries time at which the first server sends the first downlink measurement packet, and a destination device of the first downlink measurement packet is the first device.

Specifically, the first server includes the time at which the first server sends the first downlink measurement packet in the first downlink measurement packet, and sends the first downlink measurement packet to the UPF. Optionally, the first server may include the time at which the first server sends the first downlink measurement packet in a header of the first downlink measurement packet, or include the time in a payload of the first downlink measurement packet.

If the first device is a terminal device or a radio access network device, after receiving the first downlink measurement packet, the UPF sends the first downlink measurement packet to the first device.

The first downlink measurement packet is a downlink measurement packet that is sent first by the first server after the first server receives the first uplink measurement packet sent by the UPF.

S203: The UPF obtains a communication KPI between the UPF and the first server according to the communication indicator measurement rule.

In this embodiment of this application, the communication indicator measurement rule indicates the UPF to obtain the KPI between the UPF and the first server.

Manners in which the UPF obtains the communication KPI between the UPF and the first server according to the communication indicator measurement rule include but are not limited to the following several manners.

Manner 1: The UPF obtains a downlink communication KPI between the UPF and the first server according to the communication indicator measurement rule and the first downlink measurement packet.

Specifically, the UPF obtains the downlink communication KPI between the UPF and the first server based on the time at which the first server sends the first downlink measurement packet and the time at which the UPF receives the first downlink measurement packet, where the time is carried in the first downlink measurement packet.

Figure 7:
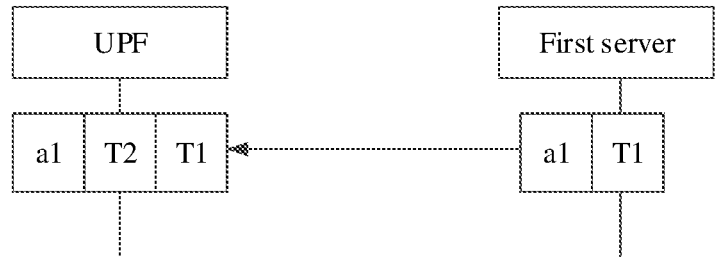
FIG. 7 is a schematic diagram of determining a communication KPI according to an embodiment of this application.

For example, in a measurement process, as shown in FIG. 7, the first server sends a first downlink measurement packet a1 to the UPF. The first downlink measurement packet a1 carries time T1 at which the first server sends the first downlink measurement packet a1. At time T2, the UPF receives the first downlink measurement packet a1. In this way, the UPF may determine that a downlink delay between the UPF and the first server is T2−T1 when the UPF transmits the first downlink measurement packet a1 with the first server.

In addition, as shown in FIG. 7, a plurality of measurements are performed. The UPF may determine downlink delays of different first downlink measurement packets between the UPF and the first server when the UPF and the first server transmit different first downlink measurement packets. Then, the UPF performs aggregation calculation to obtain a maximum downlink delay, a minimum downlink delay, and an average downlink delay between the UPF and the first server.

Further, the UPF may determine a downlink jitter between the UPF and the first server based on downlink delays of different first downlink measurement packets between the UPF and the first server when the UPF and the first server transmit different first downlink measurement packets, for example, obtain a maximum downlink jitter, a minimum downlink jitter, and an average downlink jitter between the UPF and the first server.

Manner 2: The first downlink measurement packet further carries time at which the first server receives the first uplink measurement packet, or transmission time of the first uplink measurement packet between the UPF and the first server. In this case, the UPF obtains an uplink communication KPI between the UPF and the first server according to the communication indicator measurement rule and the first downlink measurement packet.

In a case, when the first downlink measurement packet further carries the time at which the first server receives the first uplink measurement packet, the UPF obtains the uplink communication KPI between the UPF and the first server based on the time at which the first server receives the first uplink measurement packet and the time at which the UPF sends the first uplink measurement packet, where the time is carried in the first downlink measurement packet.

Specifically, the UPF obtains uplink transmission time of the first uplink measurement packet, that is, an uplink delay of the first uplink measurement packet based on the time at which the first server receives the first uplink measurement packet and the time at which the UPF sends the first uplink measurement packet, where the time is carried in the first downlink measurement packet. The uplink delay of the first uplink measurement packet is a difference between the time at which the first server receives the first uplink measurement packet and the time at which the UPF sends the first uplink measurement packet. By performing the foregoing calculation manner on a plurality of first uplink measurement packets in a measurement period, the UPF may obtain a maximum uplink delay, a minimum uplink transmission delay, and an average uplink delay between the UPF and the first server through aggregation calculation.

Figure 8:
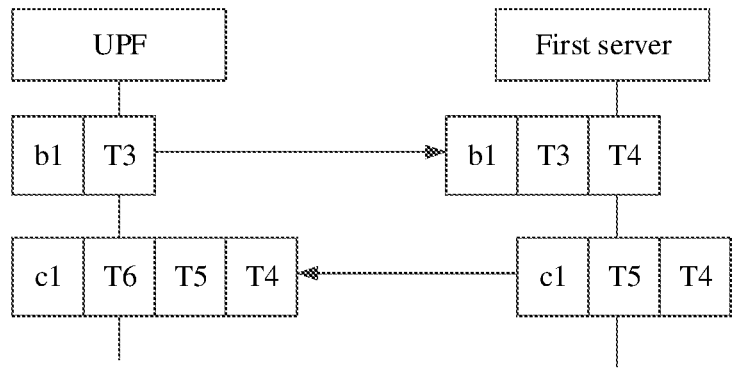
FIG. 8 is a schematic diagram of determining a communication KPI according to an embodiment of this application.

For example, in a measurement process, as shown in FIG. 8, the UPF sends a first uplink measurement packet b1 to the first server. After receiving the first uplink measurement packet b1, the first server sends a first downlink measurement packet c1 to the UPF. The first downlink measurement packet c1 carries time T4 at which the first server receives the first uplink measurement packet b1. The UPF receives the first downlink measurement packet c1 sent by the first server, and may determine, based on the time T4 at which the first server receives the first uplink measurement packet b1 and time T3 at which the UPF sends the first uplink measurement packet b1, where the time is carried in the first downlink measurement packet c1, that an uplink delay between the UPF and the first server is T4−T3 when the UPF transmits the first uplink measurement packet b1 to the first server.

As shown in FIG. 8, by performing a plurality of measurements, the UPF may determine uplink delays of different first uplink measurement packets between the UPF and the first server when the UPF and the first server transmit the different first uplink measurement packets. Then, the UPF performs aggregation calculation to obtain a maximum uplink delay, a minimum uplink delay, and an average uplink delay between the UPF and the first server.

Further, the UPF may determine an uplink jitter between the UPF and the first server, for example, obtain a maximum uplink jitter, a minimum uplink jitter, and an average uplink jitter between the UPF and the first server, based on different uplink delays between the UPF and the first server.

In another case, when the first downlink measurement packet carries the transmission time of the first uplink measurement packet between the UPF and the first server, the UPF obtains the uplink communication KPI between the UPF and the first server based on the transmission time of the first uplink measurement packet between the UPF and the first server, where the time is carried in the first downlink measurement packet. The transmission time of the first uplink measurement packet between the UPF and the first server is a difference between the time at which the first server receives the first uplink measurement packet and the time at which the UPF sends the first uplink measurement packet.

Figure 9:
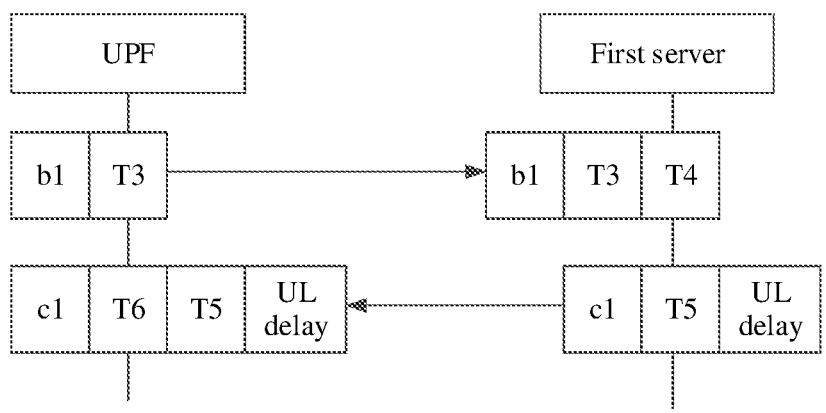
FIG. 9 is a schematic diagram of determining a communication KPI according to an embodiment of this application.

For example, in a measurement process, as shown in FIG. 9, the UPF sends a first uplink measurement packet b1 to the first server at time T3. After receiving the first uplink measurement packet b1 at time T4, the first server sends a first downlink measurement packet c1 to the UPF at time T5. The first downlink measurement packet c1 carries transmission time of the first uplink measurement packet between the UPF and the first server, that is, a UL delay, where the UL delay is T4−T3. The UPF receives the first downlink measurement packet c1 sent by the first server, and may determine, based on the transmission time, namely, the UL delay of the first uplink measurement packet between the UPF and the first server that is carried in the first downlink measurement packet c1, that an uplink delay between the UPF and the first server is T4−T3 when the UPF and the first server transmit the first uplink measurement packet b1.

As shown in FIG. 9, by performing a plurality of measurements, the UPF may determine uplink delays of different first uplink measurement packets between the UPF and the first server when the UPF and the first server transmit the different first uplink measurement packets. Then, the UPF obtains a maximum uplink delay, a minimum uplink delay, and an average uplink delay between the UPF and the first server through aggregation calculation.

Further, the UPF may determine an uplink jitter between the UPF and the first server based on different uplink delays between the UPF and the first server, for example, obtain a maximum uplink jitter, a minimum uplink jitter, and an average uplink jitter between the UPF and the first server.

In addition, still as shown in FIG. 8 and FIG. 9, the UPF obtains the downlink communication KPI between the UPF and the first server based on the time at which the first server sends the first downlink measurement packet and the time at which the UPF receives the first downlink measurement packet, where the time is carried in the first downlink measurement packet. For example, the UPF determines, based on time T5 at which the first server sends the first downlink measurement packet c1 and time T6 at which the UPF receives the first downlink measurement packet c1 that are carried in the first downlink measurement packet c1, that a downlink delay between the UPF and the first server is T6–T5 when the UPF and the first server transmit the first downlink measurement packet c1.

With reference to the foregoing manner 1, by performing a plurality of measurements, the UPF may determine the maximum downlink delay, the minimum downlink delay, and the average downlink delay between the UPF and the first server, and the maximum downlink jitter, the minimum downlink jitter, and the average downlink jitter between the UPF and the first server.

S204: The UPF obtains, based on the communication KPI between the UPF and the first server, the communication KPI corresponding to the first device.

In an example, if the first device is the UPF, the communication KPI corresponding to the first device is the communication KPI between the UPF and the first server.

In another example, if the first device is the target terminal device or the radio access network device, S204 includes: The UPF obtains the communication KPI between the first device and the UPF; and then the UPF obtains the communication KPI between the first device and the first server based on the communication KPI between the first device and the UPF and the communication KPI between the UPF and the first server.

It should be noted that the UPF may obtain the communication KPI between the first device and the UPF in an existing manner. If the first device is the target terminal device, the communication KPI between the first device and the first server may include three parts: a communication KPI between the target terminal device and the radio access network device, a communication KPI between the radio access network device and the UPF, and a communication KPI between the UPF and the first server. If the first device is the radio access network device, the communication KPI between the first device and the first server may include two pails: a communication KPI between the radio access network device and the UPF and a communication KPI between the UPF and the first server.

In an implementation, the UPF may splice the communication KPI between the first device and the UPF and the communication KPI between the UPF and the first server. For example, a minimum uplink delay between the first device and the first server is a sum of a minimum delay between the first device and the UPF and a minimum delay between the UPF and the first server; a maximum uplink delay between the first device and the first server is a sum of a maximum delay between the first device and the UPF and a maximum delay between the UPF and the first server; an average uplink transmission delay between the first device and the first server is a sum of an average delay between the first device and the UPF and an average delay between the UPF and the first server. The downlink communication KPI may also be calculated similarly.

In another implementation, the UPF calculates a transmission delay of a first uplink measurement packet between the first device and the first server. For example, the UPF uses a sum of an uplink delay of the first uplink measurement packet between the first device and the UPF and an uplink delay of the first uplink measurement packet between the UPF and the first server as an uplink delay of the first uplink measurement packet between the first device and the first server. For all first uplink measurement packets measured during the measurement period, the UPF performs the foregoing operations. After the measurement ends, the UPF may obtain, through statistics collection, a minimum uplink delay, a maximum uplink transmission delay, and an average uplink delay of a plurality of first uplink measurement packets between the first device and the first server, that is, obtain a transmission delay, a maximum uplink delay, and an average uplink delay between the first device and the first server. By using a similar method, the UPF may obtain the minimum downlink delay, the maximum downlink delay, and the average downlink delay between the first device and the first server.

By using a similar method, the UPF may obtain a maximum round trip delay, a minimum round trip delay, and an average round trip delay between the first device and the first server.

A jitter indicates a difference between uplink (or downlink) transmission delays of two neighboring uplink (or downlink) measurement packets. Therefore, an uplink jitter between the first device and the first server may be calculated based on uplink transmission time between every two neighboring uplink measurement packets in the measurement period, so that the UPF can obtain, through statistics collection, a maximum uplink jitter, a minimum uplink jitter, and an average uplink jitter between the first device and the first server. Similarly, the UPF obtains, through statistics collection, a maximum downlink jitter, a minimum downlink jitter, and an average downlink jitter between the first device and the first server based on downlink transmission time between every two neighboring downlink measurement packets in the measurement period.

S205: The UPF sends the second information to the first server.

S206: The first server obtains, based on the second information, the communication KPI corresponding to the first device.

In this embodiment of this application, the UPF obtains, based on the foregoing steps S201 to S204, the communication KPI corresponding to the first device, includes the obtained communication KPI corresponding to the first device in the second information, and sends the second information to the first server.

The communication KPI that corresponds to the first device and that is carried in the second information includes but is not limited to the following several examples:

In an example, the communication KPI corresponding to the first device includes a downlink communication KPI between the UPF and the first server. In this case, the first server may obtain the downlink communication KPI between the UPF and the first server from the second information.

In another example, the communication KPI corresponding to the first device includes an uplink communication KPI between the UPF and the first server. In this case, the first server may obtain the uplink communication KPI between the UPF and the first server from the second information.

In another example, the communication KPI corresponding to the first device includes an uplink communication KPI and a downlink communication KPI between the UPF and the first server. In this case, the first server may obtain the uplink communication KPI and the downlink communication KPI between the UPF and the first server from the second information.

In another example, the communication KPI corresponding to the first device includes an uplink communication KPI and/or a downlink communication KPI between the first device and the first server. In this case, the first server may obtain the uplink communication KPI and/or the downlink communication KPI between the first device and the first server from the second information.

According to the method in this embodiment of this application, the UPF sends the first uplink measurement packet to the first server, the first server sends the first downlink measurement packet to the UPF, and the UPF obtains the downlink communication KPI between the UPF and the first server based on the communication indicator measurement rule and the first downlink measurement packet. When the first downlink measurement packet further carries the time at which the first server receives the first uplink measurement packet or the transmission time of the first uplink measurement packet between the UPF and the first server, the UPF further obtains the uplink communication KPI between the UPF and the first server based on the first downlink measurement packet. Then, the UPF includes the determined communication KPI corresponding to the first device in the second information, and sends the second information to the first server, so that the first server can directly obtain the communication KPI corresponding to the first device from the second information.

Manner 2: The first server determines the communication KPI corresponding to the first device.

Figure 10:
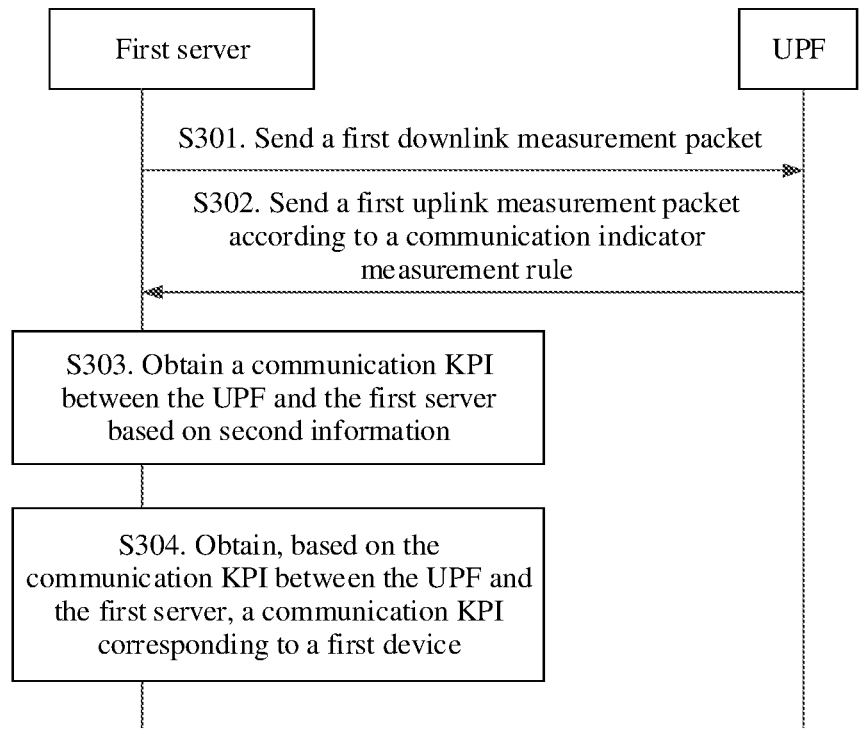
FIG. 10 is a schematic flowchart of an information transmission method according to an embodiment of this application.

FIG. 10 is a schematic flowchart of an information transmission method according to an embodiment of this application. As shown in FIG. 10, the method includes the following steps.

S301: A first server sends a first downlink measurement packet to a UPF.

The first downlink measurement packet carries time at which the first server sends the first downlink measurement packet, and a destination device of the first downlink measurement packet is a first device.

Specifically, the first server includes the time at which the first server sends the first downlink measurement packet in the first downlink measurement packet, and sends the first downlink measurement packet to the UPF. Optionally, the first server may include the time at which the first server sends the first downlink measurement packet in a header of the first downlink measurement packet, or include the time in a payload of the first downlink measurement packet.

If the first device is a terminal device or a radio access network device, after receiving the first downlink measurement packet, the UPF sends the first downlink measurement packet to the first device.

S302: The UPF sends a first uplink measurement packet to the first server according to a communication indicator measurement rule.

The first uplink measurement packet carries a parameter for obtaining a communication KPI corresponding to the first device. The parameter includes time at which the UPF sends the first uplink measurement packet, and the first uplink measurement packet is triggered by the first device.

Specifically, after receiving the first uplink measurement packet, the UPF includes, according to the communication indicator measurement rule, the time at which the UPF sends the first uplink measurement packet in the first uplink measurement packet, and sends the first uplink measurement packet to the first server. Optionally, the UPF may include the time at which the UPF sends the first uplink measurement packet in a header of the first uplink measurement packet, or include the time in a payload of the first uplink measurement packet.

In this embodiment, the foregoing second information sent by the UPF to the first server may be understood as the first uplink measurement packet.

If the first device is a target terminal device or a radio access network device, the UPF receives the first uplink measurement packet from the first device, includes the time at which the UPF receives the first uplink measurement packet in the first uplink measurement packet, and sends the first uplink measurement packet to the first server.

The first uplink measurement packet is an uplink measurement packet that is sent first by the UPF after the UPF receives the first uplink measurement packet sent by the first server.

S303: The first server obtains a communication KPI between the UPF and the first server based on second information.

The second information includes the parameter for obtaining the communication KPI corresponding to the first device.

In this embodiment of this application, based on different parameters carried in the second information, the first server obtains the communication KPI between the UPF and the first server based on the first uplink measurement packet in the following several manners:

Manner 1: When the parameter carried in the second information is the time at which the UPF sends the first uplink measurement packet, the first server obtains an uplink communication KPI between the UPF and the first server based on the time at which the UPF sends the first uplink measurement packet.

Specifically, the first server obtains the uplink communication KPI between the UPF and the first server based on the time at which the UPF sends the first uplink measurement packet and the time at which the first server receives the first uplink measurement packet that are carried in the first uplink measurement packet.

Figure 11:
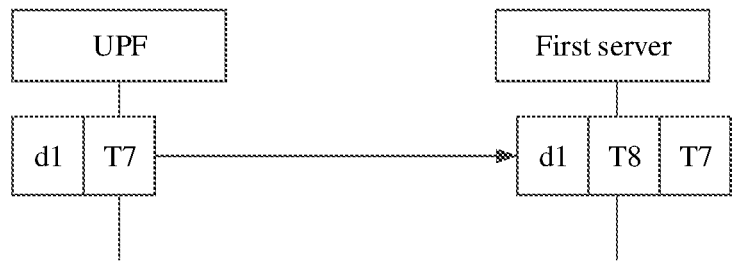
FIG. 11 is a schematic diagram of determining a communication KPI according to an embodiment of this application.

For example, in a measurement process, as shown in FIG. 11, the UPF sends a first uplink measurement packet di to the first server, and the first uplink measurement packet di carries time T7 at which the UPF sends the first uplink measurement packet di. At time T8, the first server receives the first uplink measurement packet di. In this way, the first server may determine that an uplink delay between the UPF and the first server is T8−T7 when the UPF and the first server transmit the first uplink measurement packet di.

In addition, as shown in FIG. 11, by performing a plurality of measurements, the first server may determine uplink delays of different first uplink measurement packets between the UPF and the first server when the UPF and the first server transmit the different first uplink measurement packets. Then, the first server obtains a maximum uplink delay, a minimum uplink delay, and an average uplink delay between the UPF and the first server through aggregation calculation.

Further, the first server may determine an uplink jitter between the UPF and the first server, for example, obtain a maximum uplink jitter, a minimum uplink jitter, and an average uplink jitter between the UPF and the first server, based on uplink delays of different first uplink measurement packets between the UPF and the first server when the UPF and the first server transmit different first uplink measurement packets.

Manner 2: When the parameter further includes a downlink parameter, the downlink parameter includes time at which the UPF receives the first downlink measurement packet, or transmission time of the first downlink measurement packet between the UPF and the first server. The transmission time of the first downlink measurement packet between the UPF and the first server is a difference between the time at which the UPF receives the first downlink measurement packet and the time at which the first server sends the first downlink measurement packet. In this case, the first server obtains the downlink communication KPI between the UPF and the first server based on the downlink parameter.

In a case, when the downlink parameter includes the time at which the UPF receives the first downlink measurement packet, the first server determines the downlink communication KPI between the UPF and the first server based on the time at which the UPF receives the first downlink measurement packet and the time at which the first server sends the first downlink measurement packet.

Specifically, the first server obtains downlink transmission time of the first downlink measurement packet, that is, a downlink delay of the first downlink measurement packet, based on the time at which the UPF receives the first downlink measurement packet and the time at which the first server sends the first downlink measurement packet. The downlink delay of the first downlink measurement packet is a difference between the time at which the UPF receives the first downlink measurement packet and the time at which the first server sends the first downlink measurement packet. By performing the foregoing calculation manner on a plurality of first downlink measurement packets in a measurement period, the first server may obtain a maximum downlink delay, a minimum downlink transmission delay, and an average downlink delay between the UPF and the first server through aggregation calculation.

Figure 12:
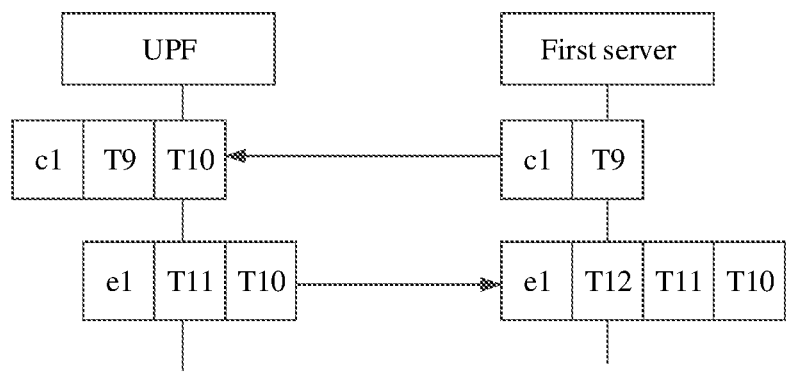
FIG. 12 is a schematic diagram of determining a communication KPI according to an embodiment of this application.

For example, in a measurement process, as shown in FIG. 12, the first server sends a first downlink measurement packet c1 to the UPF at time T9, and the UPF receives the first downlink measurement packet c1 at time T10. The UPF sends a first uplink measurement packet e1 to the first server at time T11, and the first uplink measurement packet e1 includes time T10 at which the UPF receives the first downlink measurement packet c1. The first server receives the first uplink measurement packet e1 at time T12. In this way, the first server may determine, based on the time T10 at which the UPF receives the first downlink measurement packet c1 and the time T9 at which the first server sends the first downlink measurement packet c1 that are carried in the first uplink measurement packet e1, that a downlink delay between the UPF and the first server is T10−T9 when the UPF and the first server transmit the first downlink measurement packet e1.

As shown in FIG. 12, by performing a plurality of measurements, the first server may determine downlink delays of different first downlink measurement packets between the UPF and the first server when the UPF and the first server transmit the different first downlink measurement packets. Then, the UPF obtains a maximum downlink delay, a minimum downlink delay, and an average downlink delay between the UPF and the first server through aggregation calculation.

Further, the first server may determine a downlink jitter between the UPF and the first server, for example, obtain a maximum downlink jitter, a minimum downlink jitter, and an average downlink jitter between the UPF and the first server, based on different downlink delays between the UPF and the first server.

In another case, when the parameter includes the transmission time of the first downlink measurement packet between the UPF and the first server, the first server obtains the downlink communication KPI between the UPF and the first server based on the transmission time of the first downlink measurement packet between the UPF and the first server. The transmission time of the first downlink measurement packet between the UPF and the first server is a difference between the time at which the UPF receives the first downlink measurement packet and the time at which the first server sends the first downlink measurement packet.

Figure 13:
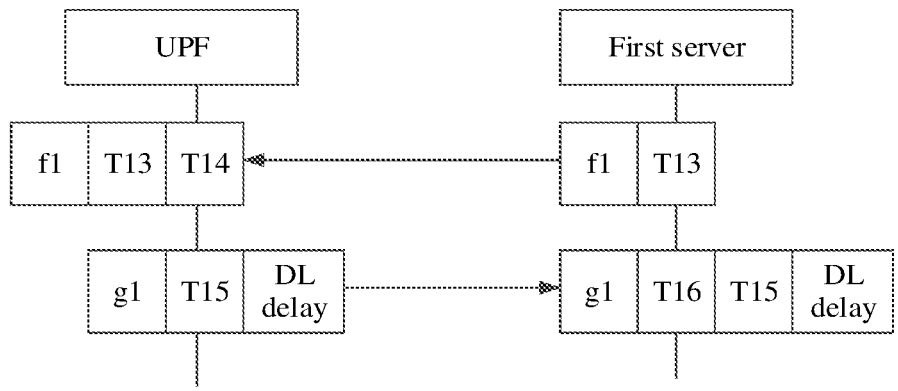
FIG. 13 is a schematic diagram of determining a communication KPI according to an embodiment of this application.

For example, in a measurement process, as shown in FIG. 13, the first server sends a first downlink measurement packet f1 to the UPF at time T13. After receiving the first downlink measurement packet f1 at time T14, the UPF sends a first uplink measurement packet g1 to the first server at time T15. The first uplink measurement packet g1 carries transmission time of the first downlink measurement packet f1 between the UPF and the first server, that is, a DL delay, where the DL delay is equal to T14−T13. After receiving the first uplink measurement packet g1 sent by the UPF, the first server may determine, based on the transmission time, namely, the DL delay of the first downlink measurement packet f1 between the UPF and the first server that is carried in the first uplink measurement packet g1, that the downlink delay between the UPF and the first server is T14 to T13 when the UPF and the first server transmit the first downlink measurement packet f1.

As shown in FIG. 13, by performing a plurality of measurements, the first server may determine downlink delays of different first downlink measurement packets between the UPF and the first server when the UPF and the first server transmit the different first downlink measurement packets. Then, the UPF obtains a maximum downlink delay, a minimum downlink delay, and an average downlink delay between the UPF and the first server through aggregation calculation.

Further, the UPF may determine the downlink jitter between the UPF and the first server, for example, obtain a maximum downlink jitter, a minimum downlink jitter, and an average downlink jitter between the UPF and the first server, based on different downlink delays between the UPF and the first server.

In addition, still as shown in FIG. 12 and FIG. 13, the first server obtains the uplink communication KPI between the UPF and the first server based on the time at which the UPF sends the first uplink measurement packet and the time at which the first server receives the first uplink measurement packet that are carried in the first uplink measurement packet. For example, the first server determines, based on time T15 at which the UPF sends a first uplink measurement packet g1 and time T16 at which the first server receives the first uplink measurement packet g1 that are carried in the first uplink measurement packet g1, that an uplink delay between the UPF and the first server is T16−T15 when the UPF and the first server transmit the first uplink measurement packet g1.

With reference to the foregoing manner 1, by performing a plurality of measurements, the first server may determine the maximum uplink delay, the minimum uplink delay, and the average uplink delay between the UPF and the first server, and the maximum uplink jitter, the minimum uplink jitter, and the average uplink jitter between the UPF and the first server.

S304: The first server obtains, based on the communication KPI between the UPF and the first server, the communication KPI corresponding to the first device.

In an example, if the first device is the UPF, the communication KPI corresponding to the first device is the communication KPI between the UPF and the first server.

In another example, if the first device is the target terminal device or the radio access network device, S304 includes: The first server obtains the communication KPI between the first device and the UPF; and then the first server obtains the communication KPI between the first device and the first server based on the communication KPI between the first device and the UPF and the communication KPI between the UPF and the first server.

It should be noted that the first server may obtain the communication KPI between the first device and the UPF in an existing manner. If the first device is the target terminal device, the communication KPI between the first device and the first server may include three parts: a communication KPI between the target terminal device and the radio access network device, a communication KPI between the radio access network device and the UPF, and a communication KPI between the UPF and the first server. If the first device is the radio access network device, the communication KPI between the first device and the first server may include two pails: a communication KPI between the radio access network device and the UPF and a communication KPI between the UPF and the first server.

In an implementation, the first server may splice the communication KPI between the first device and the UPF and the communication KPI between the UPF and the first server. For example, a minimum uplink delay between the first device and the first server is a sum of a minimum delay between the first device and the UPF and a minimum delay between the UPF and the first server; a maximum uplink delay between the first device and the first server is a sum of a maximum delay between the first device and the UPF and a maximum delay between the UPF and the first server; an average uplink transmission delay between the first device and the first server is a sum of an average delay between the first device and the UPF and an average delay between the UPF and the first server. The downlink communication KPI may also be calculated similarly.

In another implementation, the first server calculates a transmission delay of a first uplink measurement packet between the first device and the first server. For example, the first server uses a sum of an uplink delay of the first uplink measurement packet between the first device and the UPF and an uplink delay of the first uplink measurement packet between the UPF and the first server as an uplink delay of the first uplink measurement packet between the first device and the first server. For all first uplink measurement packets measured during the measurement period, the first server performs the foregoing operations. After the measurement ends, the first server may obtain, through statistics collection, a minimum uplink delay, a maximum uplink transmission delay, and an average uplink delay of a plurality of first uplink measurement packets between the first device and the first server, that is, obtain a transmission delay, a maximum uplink delay, and an average uplink delay between the first device and the first server. By using a similar method, the first server may obtain the minimum downlink delay, the maximum downlink delay, and the average downlink delay between the first device and the first server.

By using a similar method, the first server may obtain a maximum round trip delay, a minimum round trip delay, and an average round trip delay between the first device and the first server.

A jitter indicates a difference between uplink (or downlink) transmission delays of two neighboring uplink (or downlink) measurement packets. Therefore, an uplink jitter between the first device and the first server may be calculated based on uplink transmission time between every two neighboring uplink measurement packets in the measurement period, so that the first server may obtain, through statistics collection, a maximum uplink jitter, a minimum uplink jitter, and an average uplink jitter between the first device and the first server. Similarly, the first server obtains, through statistics collection, a maximum downlink jitter, a minimum downlink jitter, and an average downlink jitter between the first device and the first server based on downlink transmission time between every two neighboring downlink measurement packets in the measurement period.

In this embodiment of this application, the first server sends the first downlink measurement packet to the UPF, and the UPF sends the first uplink measurement packet to the first server. The first uplink measurement packet carries the time at which the UPF sends the first uplink measurement packet. In this way, the first server obtains the uplink communication KPI between the UPF and the first server based on the first uplink measurement packet. When the first uplink measurement packet further carries the time at which the UPF receives the first downlink measurement packet or the transmission time of the first downlink measurement packet between the UPF and the first server, the first server may further obtain the downlink communication KPI between the UPF and the first server based on the first uplink measurement packet. In this embodiment, the first server directly determines the communication KPI corresponding to the first device. An entire determining process is simple, a process of interaction with the UPF is reduced, signaling overheads are reduced, and a speed of determining the communication KPI corresponding to the first device is improved.

Manner 3: The first server determines the communication KPI corresponding to the first device.

Figure 14:
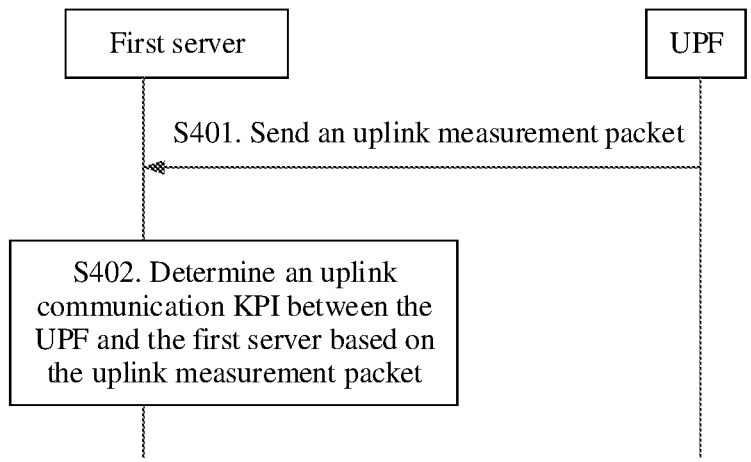
FIG. 14 is a schematic flowchart of an information transmission method according to an embodiment of this application.

FIG. 14 is a schematic flowchart of an information transmission method according to an embodiment of this application. As shown in FIG. 14, the method includes the following steps.

S401: A UPF sends an uplink measurement packet to a first server.

The uplink measurement packet carries a parameter for obtaining a communication KPI corresponding to a first device, the parameter includes time at which the UPF sends the uplink measurement packet, and the uplink measurement packet is triggered by the first device.

Optionally, the UPF may include the time at which the UPF sends the uplink measurement packet to a header of the uplink measurement packet, or include the time in a payload of the uplink measurement packet.

In this step, the foregoing second information sent by the UPF to the first server may be understood as the uplink measurement packet.

S402: The first server determines an uplink communication KPI between the UPF and the first server based on the uplink measurement packet.

Specifically, the first server obtains the uplink communication KPI between the UPF and the first server based on the time at which the UPF sends the uplink measurement packet and the time at which the first server receives the uplink measurement packet that are carried in the uplink measurement packet. For example, in a measurement process, the first server obtains, based on the time at which the UPF sends the uplink measurement packet and the time at which the first server receives the uplink measurement packet, an uplink delay of transmitting the uplink measurement packet between the UPF and the first server. With reference to this manner, by performing the measurement process on a plurality of uplink measurement packets in a measurement period, the first server may obtain a maximum downlink delay, a minimum downlink transmission delay, and an average downlink delay between the UPF and the first server through aggregation calculation.

In this embodiment of this application, the UPF sends the uplink measurement packet to the first server, where the uplink measurement packet carries the time at which the UPF sends the uplink measurement packet. In this way, the first server determines the uplink communication KPI between the UPF and the first server based on the uplink measurement packet.

In some embodiments, this embodiment of this application further includes: The first server sends the uplink communication KPI between the UPF and the first server to the UPF. The UPF obtains the uplink communication KPI between the UPF and the first server from the first server. Then, the UPF may obtain a downlink communication KPI between the UPF and the first server with reference to the embodiment shown in FIG. 6, and obtain the communication KPI between the UPF and the first server based on the uplink communication KPI and the downlink communication KPI between the UPF and the first server.

In this embodiment of this application, the UPF sends the uplink measurement packet to the first server, where the uplink measurement packet includes the time at which the UPF sends the uplink measurement packet. The first server determines the uplink communication KPI between the UPF and the first server based on the uplink measurement packet.

Figure 15:
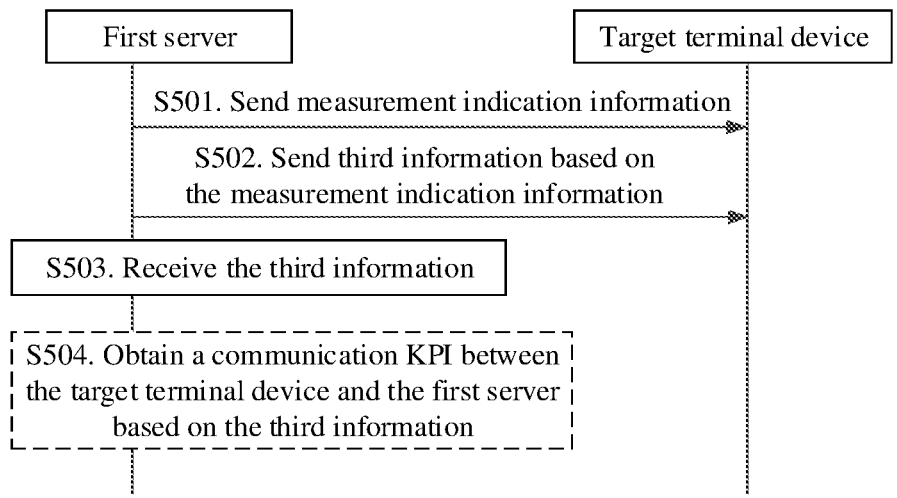
FIG. 15 is another schematic flowchart of an information transmission method according to an embodiment of this application.

Based on the foregoing embodiments, as shown in FIG. 15, an embodiment of this application discloses a solution in which a first server interacts with a target terminal device to obtain a communication KPI between the target terminal device and the first server.

FIG. 15 is another schematic flowchart of an uplink information transmission method according to an embodiment of this application. As shown in FIG. 15, the method in this embodiment of this application may include the following steps.

S501: A first server sends measurement indication information to a target terminal device.

The measurement indication information indicates to measure a communication KPI between the target terminal device and the first server.

The first server in this embodiment of this application may be the EES shown in FIG. 2, or may be another server located in a data network.

The communication KPI in this embodiment of this application includes at least one of the following: an uplink communication KPI, a downlink communication KPI, or a round trip delay.

The uplink communication KPI includes at least one of the following: a maximum uplink delay, a minimum uplink delay, an average uplink delay, a maximum uplink jitter, a minimum uplink jitter, and an average uplink jitter.

The downlink communication KPI includes at least one of the following: a maximum downlink delay, a minimum downlink delay, an average downlink delay, a maximum downlink jitter, a minimum downlink jitter, and an average downlink jitter.

In this embodiment of this application, content included in the measurement indication information includes but is not limited to the following examples:

Example 1: The measurement indication information includes a measurement indication, and the measurement indication indicates to measure the communication KPI between the target terminal device and the first server.

Example 2: The measurement indication information includes service description information, a to-be-measured communication KPI, and information about the first server.

The service description information includes a 5QI or an SDF.

The information about the first server includes an address of the first server and/or a port number of the first server.

The to-be-measured communication KPI includes, for example, a to-be-measured delay and/or jitter between the target terminal device and the first server.

Example 3: The measurement indication information includes a measurement indication, service description information, a to-be-measured communication KPI, and information about the first server.

Optionally, in some instances, the measurement indication information may further include at least one of the following: a measurement number, measurement start time and measurement end time, a total number of measurement packets, a size of a measurement packet, a protocol type (for example, a UDP, a TCP, or non-IP/Ethernet) of the measurement packet, a packet sending frequency, and the like.

In some embodiments, before S501, the method in this embodiment of this application may further include: The first server receives information about a target application, and generates first information based on the information about the target application. The target application may be a first application or a second application, and the first application is different from the second application. The information about the target application includes an identifier of an application, a service description of the application, or the like.

In some embodiments, after receiving the measurement indication information, the target terminal device triggers PDU session establishment or PDU session update, and establishes a user plane connection for communication KPI measurement between the target terminal device and the first server. For example, a 5QI of a QoS corresponding to the user plane connection is a 5GI in the service description information in the indication information, or an established PDU session is an Ethernet PDU session, and a user plane of the Ethernet PDU session is for transmitting an Ethernet data packet.

S502: The target terminal device sends third information to the first server based on the measurement indication information.

The third information includes the communication KPI between the target terminal device and the first server, or a parameter for obtaining the communication KPI between the target terminal device and the first server.

In an example, the parameter for obtaining the communication KPI between the target terminal device and the first server may include time at which the target terminal device receives a downlink measurement packet, or transmission time of the downlink measurement packet between the target terminal device and the first server. The transmission time is a difference between the time at which the target terminal device receives the downlink measurement packet and the time at which the first server sends the downlink measurement packet.

In another example, the parameter for obtaining the communication KPI between the target terminal device and the first server may include time at which the target terminal device sends an uplink measurement packet.

S503: The first server receives the third information from the target terminal device.

It can be learned from S502 that content carried in the third information varies in different cases.

In a first case, when the third information carries the communication KPI between the target terminal device and the first server, the first server may directly obtain the communication KPI between the target terminal device and the first server from the third information.

In a second case, when the third information carries the parameter for obtaining the communication KPI between the target terminal device and the first server, this embodiment of this application further includes the following step S504:

S504: The first server obtains the communication KPI between the target terminal device and the first server based on the third information.

Specifically, when the third information carries the parameter for obtaining the communication KPI between the target terminal device and the first server, the first server obtains the communication KPI between the target terminal device and the first server based on the parameter for obtaining the communication KPI between the target terminal device and the first server that is carried in the third information. For example, when the parameter includes the time at which the target terminal device receives the downlink measurement packet, the first server obtains a downlink communication KPI between the target terminal device and the first server based on the time at which the target terminal device receives the downlink measurement packet and the time at which the first server sends the downlink measurement packet. When the parameter includes the transmission time of the downlink measurement packet between the target terminal device and the first server, the first server obtains a downlink communication KPI between the target terminal device and the first server based on the transmission time. For another example, when the parameter includes the time at which the target terminal device sends the uplink measurement packet, the first server obtains an uplink communication KPI between the target terminal device and the first server based on the time at which the target terminal device sends the uplink measurement packet and time at which the first server receives the uplink measurement packet.

In this embodiment of this application, according to the foregoing steps, the first server obtains the communication KPI between the target terminal device and the first server, where the communication KPI between the target terminal device and the first server includes a communication KPI between a UPF and the first server. Therefore, a technical problem that the communication KPI between the UPF and the first server cannot be obtained currently is resolved.

In some embodiments, after obtaining the KPI between the target terminal device and the first server according to the foregoing steps, the first server sends the KPI between the target terminal device and the first server to an ECS, an EAS, or a terminal device. In a subsequent EES selection process, the ECS, the EAS, or the terminal device may select an EES based on the KPI between the target terminal device and the first server, so that a selected EES better meets a KPI requirement of a user. When UE and the selected EES perform EAS discovery, an EAS that meets a KPI requirement of the user may be provided for the user, to improve service experience of the user.

According to the information transmission method provided in this embodiment of this application, the first server sends the measurement indication information to the target terminal device, where the measurement indication information indicates to measure the KPI between the target terminal device and the first server. The target terminal device sends the third information to the first server based on the measurement indication information. In this way, the first server may obtain the KPI between the target terminal device and the first server based on the third information, so as to measure the KPI between the target terminal device and the first server. In the subsequent EES selection process, the EES may be selected based on the measured KPI between the target terminal device and the first server, so that the selected EES better meets the KPI requirement for the user, and user experience is improved. In addition, in this embodiment of this application, the first server directly interacts with the target terminal device without using an intermediate network element. This improves communication efficiency and reduces signaling overheads.

With reference to specific examples, the following describes in detail a process in which the first server obtains the communication KPI between the target terminal device and the first server in this embodiment of this application.

Manner 1: The target terminal device determines the communication KPI between the target terminal device and the first server.

Figure 16:
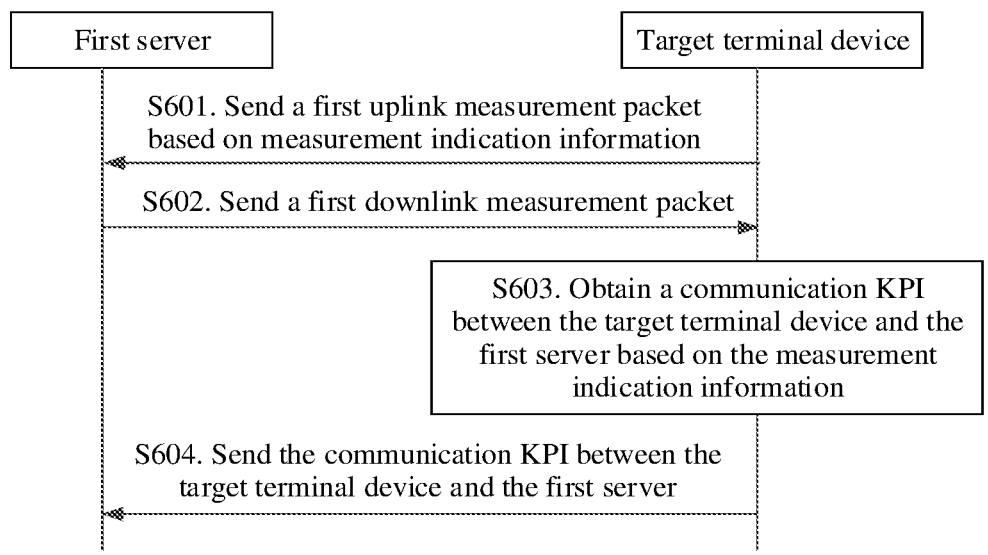
FIG. 16 is a schematic flowchart of an information transmission method according to an embodiment of this application.

FIG. 16 is a schematic flowchart of an information transmission method according to an embodiment of this application. As shown in FIG. 16, the method in this embodiment includes the following steps.

S601: A target terminal device sends a first uplink measurement packet to a first server based on measurement indication information.

The first uplink measurement packet carries a parameter for obtaining a communication KPI between the target terminal device and the first server, and the parameter includes time at which the target terminal device sends the first uplink measurement packet.

Optionally, the target terminal device may include time at which the target terminal device sends the first uplink measurement packet in a header of the first uplink measurement packet, or include the time in a payload of the first uplink measurement packet.

In this embodiment, third information sent by the target terminal device to the first server may be understood as the first uplink measurement packet.

S602: The first server sends a first downlink measurement packet to the target terminal device.

The first downlink measurement packet carries time at which the first server sends the first downlink measurement packet.

Optionally, the first server may include time at which the first server sends the first downlink measurement packet in a header of the first downlink measurement packet, or include the time in a payload of the first downlink measurement packet.

The first downlink measurement packet is a downlink measurement packet that is sent first by the first server after the first server receives the first uplink measurement packet sent by the target terminal device.

S603: The target terminal device obtains the communication KPI between the target terminal device and the first server based on the measurement indication information.

In this embodiment of this application, the measurement indication information indicates the target terminal device to obtain the KPI between the target terminal device and the first server.

Manners in which the target terminal device obtains the communication KPI between the target terminal device and the first server based on the measurement indication information include but are not limited to the following several manners:

Manner 1: The target terminal device determines a downlink communication KPI between the target terminal device and the first server based on the measurement indication information and the first downlink measurement packet.

Specifically, the target terminal device obtains the downlink communication KPI between the target terminal device and the first server based on the time at which the first server sends the first downlink measurement packet and time at which the target terminal device receives the first downlink measurement packet that are carried in the first downlink measurement packet.

Figure 17:
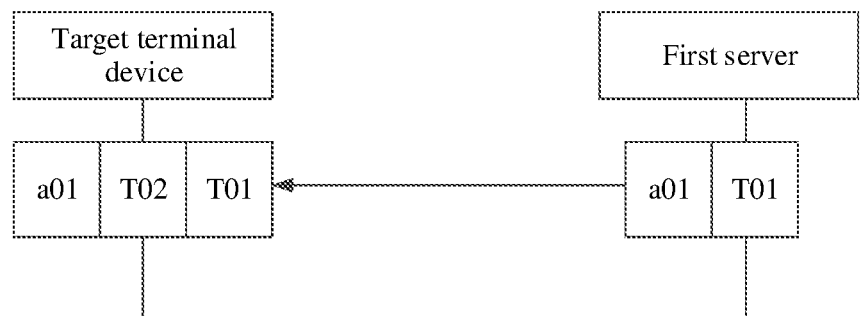
FIG. 17 is a schematic diagram of determining a communication KPI according to an embodiment of this application.

For example, in a measurement process, as shown in FIG. 17, the first server sends a first downlink measurement packet a01 to the target terminal device, and the first downlink measurement packet a01 carries time T01 at which the first server sends the first downlink measurement packet a01. At time T02, the target terminal device receives the first downlink measurement packet a01. In this way, the target terminal device may determine that a downlink delay between the target terminal device and the first server is T02−T01 when the target terminal device and the first server transmit the first downlink measurement packet a01.

In addition, as shown in FIG. 17, by performing a plurality of measurements, the target terminal device may determine downlink delays of different first downlink measurement packets between the target terminal device and the first server when the target terminal device and the first server transmit the different first downlink measurement packets. Then, the target terminal device performs aggregation calculation to obtain a maximum downlink delay, a minimum downlink delay, and an average downlink delay between the target terminal device and the first server.

Further, the target terminal device may determine a downlink jitter between the target terminal device and the first server, for example, obtain a maximum downlink jitter, a minimum downlink jitter, and an average downlink jitter between the target terminal device and the first server, based on downlink delays of different first uplink measurement packets between the target terminal device and the first server when the target terminal device and the first server transmit different first downlink measurement packets.

Further, the target terminal device may obtain a maximum round trip delay, a minimum round trip delay, and an average round trip delay between the first device and the first server.

Manner 2: The first downlink measurement packet further carries time at which the first server receives the first uplink measurement packet, or transmission time of the first uplink measurement packet between the target terminal device and the first server. In this case, the target terminal device obtains an uplink communication KPI between the target terminal device and the first server based on the measurement indication information and the first downlink measurement packet.

In a case, when the first downlink measurement packet further carries the time at which the first server receives the first uplink measurement packet, the target terminal device obtains the uplink communication KPI between the target terminal device and the first server based on the time at which the first server receives the first uplink measurement packet and the time at which the target terminal device sends the first uplink measurement packet that are carried in the first downlink measurement packet.

Specifically, the target terminal device obtains uplink transmission time of the first uplink measurement packet, that is, an uplink delay of the first uplink measurement packet, based on the time at which the first server receives the first uplink measurement packet and the time at which the target terminal device sends the first uplink measurement packet that are carried in the first downlink measurement packet. The uplink delay of the first uplink measurement packet is a difference between the time at which the first server receives the first uplink measurement packet and the time at which the target terminal device sends the first uplink measurement packet. By performing the foregoing calculation manner on a plurality of first uplink measurement packets in a measurement period, the target terminal device may obtain a maximum uplink delay, a minimum uplink transmission delay, and an average uplink delay between the target terminal device and the first server through aggregation calculation.

Figure 18:
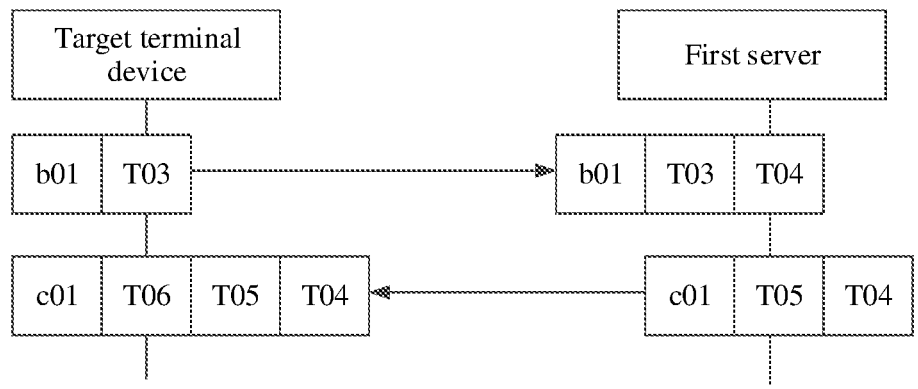
FIG. 18 is a schematic diagram of determining a communication KPI according to an embodiment of this application.

For example, in a measurement process, as shown in FIG. 18, the target terminal device sends a first uplink measurement packet b01 to the first server. After receiving the first uplink measurement packet b01, the first server sends a first downlink measurement packet co1 to the target terminal device. The first downlink measurement packet c01 carries time T04 at which the first server receives the first uplink measurement packet b01. After receiving the first downlink measurement packet c01 sent by the first server, the target terminal device may determine, based on the time T04 at which the first server receives the first uplink measurement packet b01 and the time T03 at which the target terminal device sends the first uplink measurement packet b01 that are carried in the first downlink measurement packet co1, that an uplink delay between the target terminal device and the first server is T04−T03 when the target terminal device and the first server transmit the first uplink measurement packet b01.

As shown in FIG. 18, by performing a plurality of measurements, the target terminal device may determine uplink delays of different first uplink measurement packets between the target terminal device and the first server when the target terminal device and the first server transmit the different first uplink measurement packets. Then, the target terminal device obtains a maximum uplink delay, a minimum uplink delay, and an average uplink delay between the target terminal device and the first server through aggregation calculation.

Further, the target terminal device may determine an uplink jitter between the target terminal device and the first server, for example, obtain a maximum uplink jitter, a minimum uplink jitter, and an average uplink jitter between the target terminal device and the first server, based on different uplink delays between the target terminal device and the first server.

In another case, when the first downlink measurement packet carries the transmission time of the first uplink measurement packet between the target terminal device and the first server, the target terminal device obtains the uplink communication KPI between the target terminal device and the first server based on the transmission time of the first uplink measurement packet between the target terminal device and the first server that is carried in the first downlink measurement packet. The transmission time of the first uplink measurement packet between the target terminal device and the first server is a difference between the time at which the first server receives the first uplink measurement packet and the time at which the target terminal device sends the first uplink measurement packet.

Figure 19:
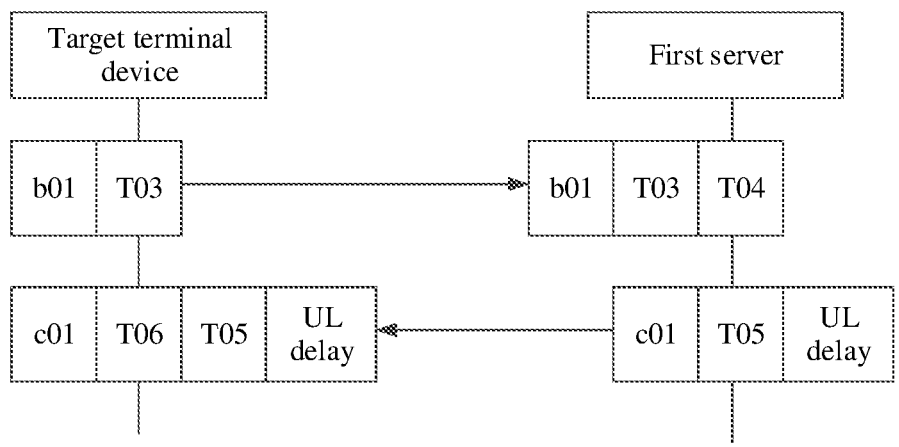
FIG. 19 is a schematic diagram of determining a communication KPI according to an embodiment of this application.

For example, in a measurement process, as shown in FIG. 19, the target terminal device sends a first uplink measurement packet b01 to the first server at time T03. After receiving the first uplink measurement packet b01 at time T04, the first server sends a first downlink measurement packet c01 to the target terminal device at time T5. The first downlink measurement packet c01 carries transmission time, namely, a UL delay, of the first uplink measurement packet between the target terminal device and the first server, where the UL delay is equal to T04−T03. After receiving the first downlink measurement packet c01 sent by the first server, the target terminal device may determine, based on the transmission time, namely, the UL delay of the first uplink measurement packet between the target terminal device and the first server that is carried in the first downlink measurement packet col, that the uplink delay between the target terminal device and the first server is T04−T03 when the target terminal device and the first server transmit the first uplink measurement packet b01.

As shown in FIG. 19, by performing a plurality of measurements, the target terminal device may determine uplink delays of different first uplink measurement packets between the target terminal device and the first server when the target terminal device and the first server transmit different first uplink measurement packets. Then, the target terminal device obtains a maximum uplink delay, a minimum uplink delay, and an average uplink delay between the target terminal device and the first server through aggregation calculation.

Further, the target terminal device may determine an uplink jitter between the target terminal device and the first server, for example, obtain a maximum uplink jitter, a minimum uplink jitter, and an average uplink jitter between the target terminal device and the first server, based on different uplink delays between the target terminal device and the first server.

In addition, still as shown in FIG. 18 and FIG. 19, the target terminal device obtains the downlink communication KPI between the target terminal device and the first server based on the time at which the first server sends the first downlink measurement packet and the time at which the target terminal device receives the first downlink measurement packet that are carried in the first downlink measurement packet. For example, the target terminal device determines, based on time Toy at which the first server sends a first downlink measurement packet c01 and time T06 at which the target terminal device receives the first downlink measurement packet c01 that are carried in the first downlink measurement packet col, that a downlink delay between the target terminal device and the first server is T06−T05 when the target terminal device and the first server transmit the first downlink measurement packet col.

With reference to the foregoing manner 1, by performing a plurality of measurements, the target terminal device may determine the maximum downlink delay, the minimum downlink delay, and the average downlink delay between the target terminal device and the first server, and the maximum downlink jitter, the minimum downlink jitter, and the average downlink jitter between the target terminal device and the first server.

S604: The target terminal device sends the communication KPI between the target terminal device and the first server to the first server.

The target terminal device determines the communication KPI between the target terminal device and the first server according to the manner in S602. Then, the target terminal device includes the determined communication KPI between the target terminal device and the first server in the third information, and sends the third information to the first server.

According to the method in this embodiment of this application, the target terminal device sends the first uplink measurement packet to the first server, the first server sends the first downlink measurement packet to the target terminal device, and the target terminal device obtains the downlink communication KPI between the target terminal device and the first server according to a communication indicator measurement rule and the first downlink measurement packet. When the first downlink measurement packet further carries the time at which the first server receives the first uplink measurement packet, or the transmission time of the first uplink measurement packet between the target terminal device and the first server, the target terminal device further obtains the uplink communication KPI between the target terminal device and the first server based on the first downlink measurement packet. Then, the target terminal device includes the determined communication KPI corresponding to the first device in the third information and sends the third information to the first server, so that the first server can directly obtain the communication KPI corresponding to the first device from the third information.

Figure 20:
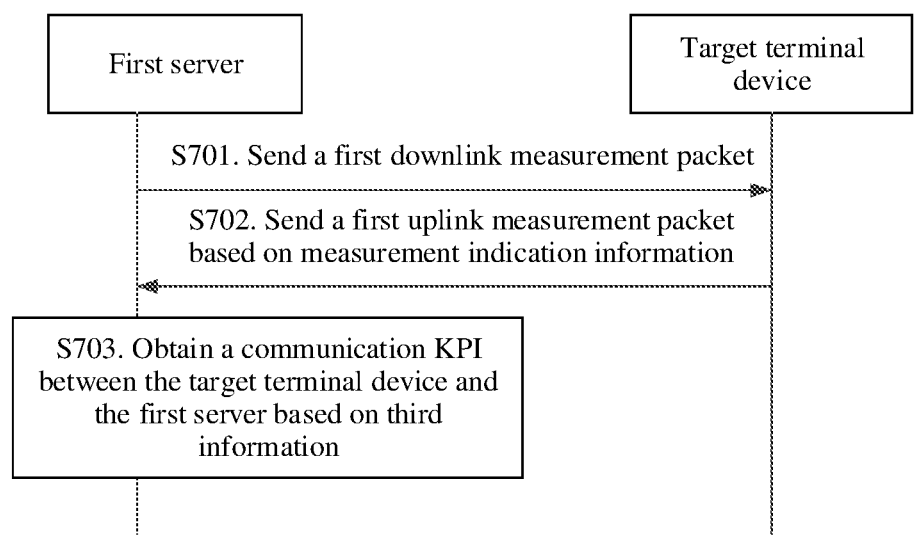
FIG. 20 is a schematic flowchart of an information transmission method according to an embodiment of this application.

Manner 2: The first server determines the communication KPI between the target terminal device and the first server FIG. 20 is a schematic flowchart of an information transmission method according to an embodiment of this application. As shown in FIG. 20, the method in this embodiment includes the following steps.

S701: A first server sends a first downlink measurement packet to a target terminal device.

The first downlink measurement packet carries time at which the first server sends the first downlink measurement packet.

Optionally, the first server may include time at which the first server sends the first downlink measurement packet in a header of the first downlink measurement packet, or include the time in a payload of the first downlink measurement packet.

S702: The target terminal device sends a first uplink measurement packet to the first server based on measurement indication information.

The first uplink measurement packet carries a parameter, and the parameter includes time at which the target terminal device sends the first uplink measurement packet.

Optionally, the target terminal device may include time at which the target terminal device sends the first uplink measurement packet in a header of the first uplink measurement packet, or include the time in a payload of the first uplink measurement packet.

In this embodiment, third information sent by the target terminal device to the first server may be understood as the first uplink measurement packet.

The first uplink measurement packet is an uplink measurement packet that is sent first by the target terminal device after the target terminal device receives the first uplink measurement packet sent by the first server.

S703: The first server obtains a communication KPI between the target terminal device and the first server based on the third information.

The third information includes a parameter for obtaining the communication KPI between the target terminal device and the first server.

In this embodiment of this application, based on different parameters carried in the third information, the first server obtains the communication KPI between the target terminal device and the first server based on the first uplink measurement packet in the following several manners:

Manner 1: When the parameter carried in the third information is the time at which the target terminal device sends the first uplink measurement packet, the first server obtains an uplink communication KPI between the target terminal device and the first server based on the time at which the target terminal device sends the first uplink measurement packet.

Specifically, the first server obtains the uplink communication KPI between the target terminal device and the first server based on the time at which the target terminal device sends the first uplink measurement packet and time at which the first server receives the first uplink measurement packet that are carried in the first uplink measurement packet.

Figure 21:
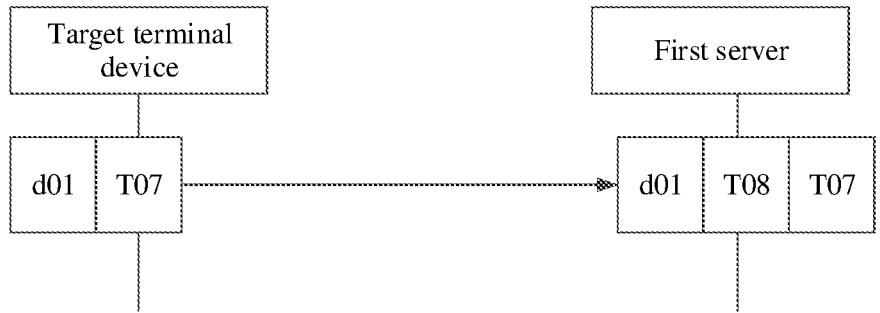
FIG. 21 is a schematic diagram of determining a communication KPI according to an embodiment of this application.

For example, in a measurement process, as shown in FIG. 21, the target terminal device sends a first uplink measurement packet d01 to the first server, and the first uplink measurement packet d01 carries time T07 at which the target terminal device sends the first uplink measurement packet d01. At time T08, the first server receives the first uplink measurement packet d01. In this way, the first server may determine that an uplink delay between the target terminal device and the first server is T08-T07 when the target terminal device and the first server transmit the first uplink measurement packet d01.

In addition, as shown in FIG. 21, by performing a plurality of measurements, the first server may determine uplink delays of different first uplink measurement packets between the target terminal device and the first server when the target terminal device and the first server transmit the different first uplink measurement packets. Then, the first server obtains a maximum uplink delay, a minimum uplink delay, and an average uplink delay between the target terminal device and the first server through aggregation calculation.

Further, the first server may determine an uplink jitter between the target terminal device and the first server, for example, obtain a maximum uplink jitter, a minimum uplink jitter, and an average uplink jitter between the target terminal device and the first server, based on uplink delays for different first uplink measurement packets between the target terminal device and the first server when the target terminal device and the first server transmit different first uplink measurement packets.

Manner 2: When the parameter further includes a downlink parameter, the downlink parameter includes time at which the target terminal device receives the first downlink measurement packet, or transmission time of the first downlink measurement packet between the target terminal device and the first server. In this case, the first server obtains a downlink communication KPI between the target terminal device and the first server based on the downlink parameter.

In a case, when the downlink parameter includes the time at which the target terminal device receives the first downlink measurement packet, the first server determines the downlink communication KPI between the target terminal device and the first server based on the time at which the target terminal device receives the first downlink measurement packet and the time at which the first server sends the first downlink measurement packet.

With reference to the foregoing embodiment, the first server measures a plurality of first downlink measurement packets in a measurement period, and may obtain a maximum downlink delay, a minimum downlink transmission delay, and an average downlink delay between the target terminal device and the first server through aggregation calculation.

Figure 22:
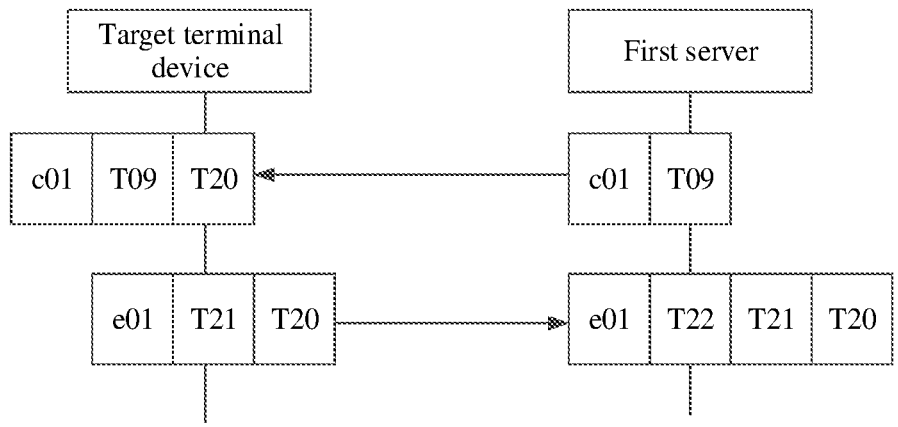
FIG. 22 is a schematic diagram of determining a communication KPI according to an embodiment of this application.

For example, in a measurement process, as shown in FIG. 22, the first server sends a first downlink measurement packet c01 to the target terminal device at time T09, and the target terminal device receives the first downlink measurement packet c01 at time T20. The target terminal device sends a first uplink measurement packet e01 to the first server at time T21, where the first uplink measurement packet e01 includes the time T20 at which the target terminal device receives the first downlink measurement packet col. The first server receives the first uplink measurement packet a1 at time T22. In this way, the first server may obtain, based on the time T20 at which the target terminal device receives the first downlink measurement packet c01 and the time T09 at which the first server sends the first downlink measurement packet c01 that are carried in the first uplink measurement packet e01, that a downlink delay between the target terminal device and the first server is T20-T09 when the target terminal device and the first server transmit the first downlink measurement packet e01.

As shown in FIG. 22, by performing a plurality of measurements, the first server may determine downlink delays of different first downlink measurement packets between the target terminal device and the first server when the target terminal device and the first server transmit the different first downlink measurement packets. Then, the target terminal device obtains a maximum downlink delay, a minimum downlink delay, and an average downlink delay between the target terminal device and the first server through aggregation calculation.

Further, the first server may determine a downlink jitter between the target terminal device and the first server, for example, obtain a maximum downlink jitter, a minimum downlink jitter, and an average downlink jitter between the target terminal device and the first server, based on different downlink delays between the target terminal device and the first server.

In another case, when the parameter includes the transmission time of the first downlink measurement packet between the target terminal device and the first server, the first server obtains the downlink communication KPI between the target terminal device and the first server based on the transmission time of the first downlink measurement packet between the target terminal device and the first server.

Figure 23:
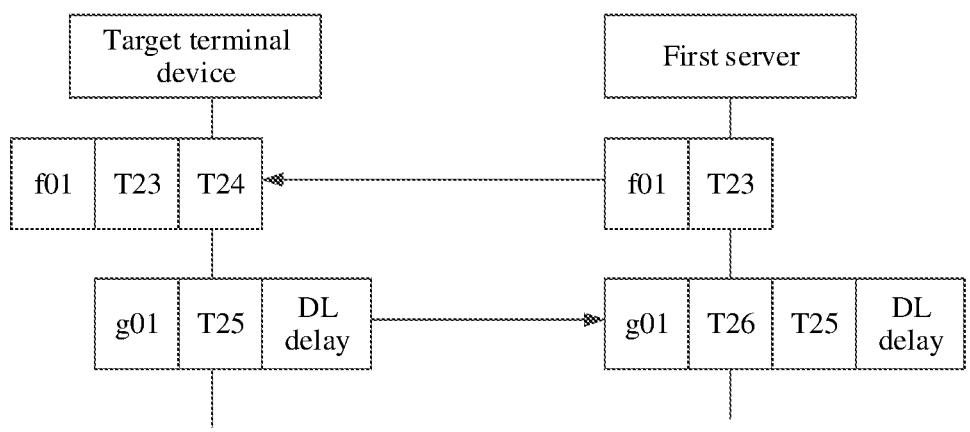
FIG. 23 is a schematic diagram of determining a communication KPI according to an embodiment of this application.

For example, in a measurement process, as shown in FIG. 23, the first server sends a first downlink measurement packet f01 to the target terminal device at time T23. After receiving the first downlink measurement packet f01 at time T24, the target terminal device sends a first uplink measurement packet g01 to the first server at time T25. The first uplink measurement packet g01 carries a transmission time, namely, a DL delay, of the first downlink measurement packet f01 between the target terminal device and the first server, where the DL delay is equal to T24-T23. The first server receives the first uplink measurement packet g01 sent by the target terminal device, and may determine, based on the transmission time, namely, the DL delay, of the first downlink measurement packet f01 between the target terminal device and the first server that is carried in the first uplink measurement packet g01, that a downlink delay between the target terminal device and the first server is T24-T23 when the target terminal device and the first server transmit the first downlink measurement packet f01.

As shown in FIG. 23, by performing a plurality of measurements, the first server may determine downlink delays of different first downlink measurement packets between the target terminal device and the first server when the target terminal device and the first server transmit the different first downlink measurement packets. Then, the target terminal device obtains a maximum downlink delay, a minimum downlink delay, and an average downlink delay between the target terminal device and the first server through aggregation calculation.

Further, the target terminal device may determine a downlink jitter between the target terminal device and the first server, for example, obtain a maximum downlink jitter, a minimum downlink jitter, and an average downlink jitter between the target terminal device and the first server, based on different downlink delays between the target terminal device and the first server.

In addition, still as shown in FIG. 22 and FIG. 23, the first server obtains the uplink communication KPI between the target terminal device and the first server based on the time at which the target terminal device sends the first uplink measurement packet and the time at which the first server receives the first uplink measurement packet that are carried in the first uplink measurement packet.

In this embodiment of this application, the first server sends the first downlink measurement packet to the target terminal device, and the target terminal device sends the first uplink measurement packet to the first server, where the first uplink measurement packet carries the time at which the target terminal device sends the first uplink measurement packet. In this way, the first server obtains the uplink communication KPI between the target terminal device and the first server based on the first uplink measurement packet. When the first uplink measurement packet further carries the time at which the target terminal device receives the first downlink measurement packet or the transmission time of the first downlink measurement packet between the target terminal device and the first server, the first server may further obtain the downlink communication KPI between the target terminal device and the first server based on the first uplink measurement packet. In this embodiment, the first server directly determines the communication KPI corresponding to the first device. An entire determining process is simple, a process of interaction with the target terminal device is reduced, signaling overheads are reduced, and a speed of determining the communication KPI corresponding to the first device is improved.

Manner 3: The first server determines the communication KPI between the target terminal device and the first server.

Figure 24:
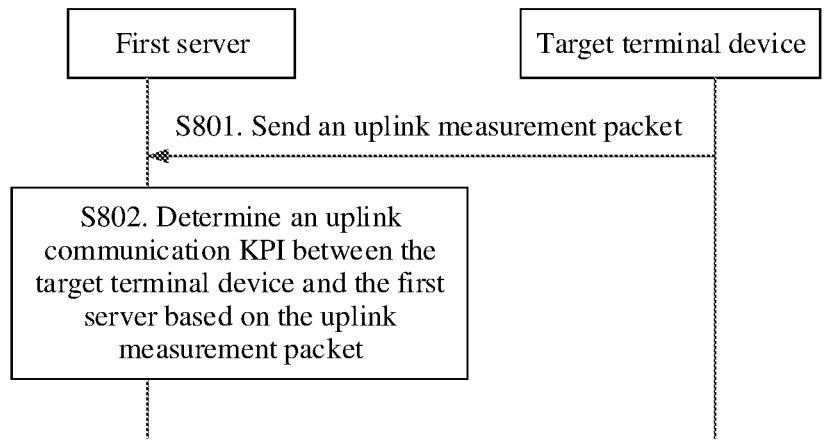
FIG. 24 is a schematic flowchart of an information transmission method according to an embodiment of this application.

FIG. 24 is a schematic flowchart of an information transmission method according to an embodiment of this application. As shown in FIG. 24, the method includes the following steps.

S801: A target terminal device sends an uplink measurement packet to a first server.

The uplink measurement packet carries a parameter for obtaining a communication KPI between the target terminal device and the first server, and the parameter includes time at which the target terminal device sends the uplink measurement packet.

Optionally, the target terminal device may include time at which the target terminal device sends the uplink measurement packet in a header of the uplink measurement packet, or include the time in a payload of the uplink measurement packet.

In this step, the foregoing third information sent by the target terminal device to the first server may be understood as the uplink measurement packet.

S802: The first server determines an uplink communication KPI between the target terminal device and the first server based on the uplink measurement packet.

Specifically, the first server obtains the uplink communication KPI between the target terminal device and the first server based on the time at which the target terminal device sends the uplink measurement packet and time at which the first server receives the uplink measurement packet that are carried in the uplink measurement packet. For example, in a measurement process, the first server obtains, based on the time at which the target terminal device sends the uplink measurement packet and the time at which the first server receives the uplink measurement packet, an uplink delay of transmitting the uplink measurement packet between the target terminal device and the first server. With reference to this manner, the first server performs the measurement process on a plurality of uplink measurement packets in a measurement period, and the first server may obtain a maximum downlink delay, a minimum downlink transmission delay, and an average downlink delay between the target terminal device and the first server through aggregation calculation.

In this embodiment of this application, the target terminal device sends the uplink measurement packet to the first server. The uplink measurement packet carries the time at which the target terminal device sends the uplink measurement packet. In this way, the first server determines the uplink communication KPI between the target terminal device and the first server based on the uplink measurement packet.

In some embodiments, this embodiment of this application further includes: The first server sends an uplink communication KPI between the target terminal device and the first server to the target terminal device. The target terminal device obtains the uplink communication KPI between the target terminal device and the first server from the first server. Then, the target terminal device may obtain a downlink communication KPI between the target terminal device and the first server with reference to the embodiment shown in FIG. 6, and further obtain the communication KPI between the target terminal device and the first server based on the uplink communication KPI and the downlink communication KPI between the target terminal device and the first server.

In this embodiment of this application, the target terminal device sends the uplink measurement packet to the first server, where the uplink measurement packet includes the time at which the target terminal device sends the uplink measurement packet. The first server determines the uplink communication KPI between the target terminal device and the first server based on the uplink measurement packet.

Based on the foregoing embodiments, if the first device in embodiments of this application is the target terminal device, this embodiment of this application further relates to a process of determining the target terminal device.

A method for determining the target terminal device by the first server includes but is not limited to the following manners:

Manner 1: The first server determines the target terminal device based on measurement configuration information.

The measurement configuration information includes at least one of a measurement area and application information.

In some embodiments, if the measurement configuration information includes the measurement area, the target terminal device is located in the measurement area.

In some embodiments, if the measurement configuration information includes the application information, the target terminal device is installed with an application corresponding to the application information. In an example, if the application information includes an application identifier, the target terminal device is installed with an application corresponding to the application identifier. Alternatively, when the application information includes an application type, for example, a first application type, the target terminal device is installed with an application of the first application type. Optionally, the first application type may be a type of an application corresponding to the foregoing application identifier. For example, the application corresponding to the application identifier is an application A, and the application type of the application A is a video type. In this case, a terminal device installed with the video type application may be determined as the target terminal device.

In some embodiments, if the measurement configuration information includes the measurement area and the application information, the target terminal device is installed with an application corresponding to the application information, and the target terminal device is located in the measurement area.

In this manner, before the first server determines the target terminal device based on the measurement configuration information, the method further includes: The first server receives the measurement configuration information from a second server, where the second server may be an ECS. Alternatively, the first server receives application information from a terminal device. For example, an EEC on the terminal device initiates an EAS discovery request, and the discovery request carries the application information. Optionally, the discovery request may further carry an identifier of the EEC or an identifier of the terminal device, and the EAS discovery request is for requesting an EES to provide information about a requested EAS.

Manner 2: The first server obtains identification information of one or more terminal devices from the EAS, where the one or more terminal devices are terminal devices connected to the EAS. In this way, the first server determines a terminal device corresponding to the identification information of the one or more terminal devices as the target terminal device.

Manner 3: The first server periodically determines the target terminal device based on the measurement configuration information preconfigured on the first server. The measurement configuration information preconfigured on the first server is the same as that in the foregoing manner 1, and also includes at least one of a measurement area and application information.

In this implementation, a process in which the first server determines the target terminal device based on the measurement configuration information is the same as that in the manner 1. For example, in some embodiments, if the measurement configuration information is the measurement area, the target terminal device is located in the measurement area. In some embodiments, if the measurement configuration information is the application information, the target terminal device is installed with an application corresponding to the application information. Alternatively, the target terminal device is installed with a first-type application, and the first-type application is a type of an application corresponding to the application information. In some embodiments, if the measurement configuration information includes the measurement area and the application, the target terminal device is installed with an application corresponding to the application information, and the target terminal device is located in the measurement area.

Figure 25:
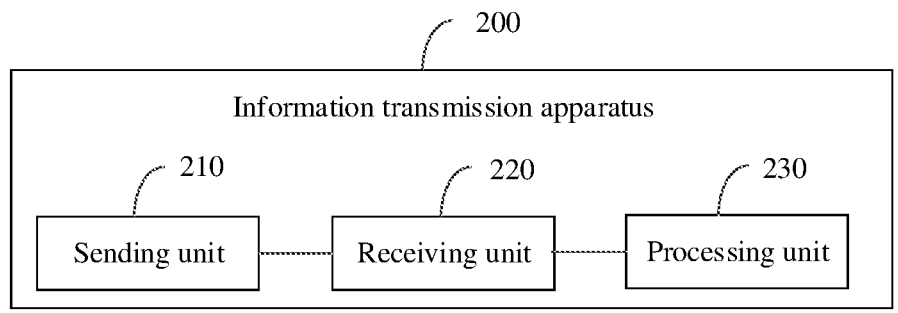
FIG. 25 is a schematic structural diagram of an information transmission apparatus according to an embodiment of this application.

FIG. 25 is a schematic structural diagram of an information transmission apparatus according to an embodiment of this application. The information transmission apparatus may be a first server, or may be a component (for example, an integrated circuit or a chip) of the first server. As shown in FIG. 25, the information transmission apparatus 200 may include a sending unit 210 and a receiving unit 220.

The sending unit 210 is configured to send first information to a policy control function PCF, where the first information is for measuring a communication key performance indicator KPI corresponding to a first device.

The receiving unit 220 is configured to receive second information from a user plane function UPF, where the second information includes the communication KPI corresponding to the first device, or a parameter for obtaining the communication KPI corresponding to the first device.

The communication KPI includes a communication KPI between the UPF and the first server.

In an implementation, when the second information includes the parameter for obtaining the communication KPI corresponding to the first device, the apparatus further includes a processing unit 230.

The processing unit 230 is configured to obtain, based on the second information, the communication KPI corresponding to the first device.

In an implementation, the receiving unit 220 is further configured to receive information about a target application.

The processing unit 230 is configured to generate the first information based on the information about the target application.

In an implementation, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation, the first information includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

In an implementation, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In an implementation, the receiving unit 220 is specifically configured to receive a first uplink measurement packet from the UPF, where the first uplink measurement packet carries the parameter, the parameter includes time at which the UPF sends the first uplink measurement packet, and the first uplink measurement packet is triggered by the first device; and the sending unit 210 is further configured to send a first downlink measurement packet to the UPF, where the first downlink measurement packet carries time at which the first server sends the first downlink measurement packet, and a destination device of the first downlink measurement packet is the first device.

In an implementation, the processing unit 230 is configured to: obtain the communication KPI between the UPF and the first server based on the second information; and obtain, based on the communication KPI between the UPF and the first server, the communication KPI corresponding to the first device.

In an implementation, the parameter further includes a downlink parameter, and the downlink parameter includes time at which the UPF receives the first downlink measurement packet, or transmission time of the first downlink measurement packet between the UPF and the first server; and the processing unit 230 is specifically configured to obtain a downlink communication KPI between the UPF and the first server based on the downlink parameter.

In an implementation, the processing unit 230 is specifically configured to obtain an uplink communication KPI between the UPF and the first server based on the time at which the UPF sends the first uplink measurement packet.

In an implementation, the first device is a target terminal device or a radio access network device, and the processing unit 230 is specifically configured to: obtain a communication KPI between the first device and the UPF; and obtain the communication KPI between the first device and the first server based on the communication KPI between the first device and the UPF and the communication KPI between the UPF and the first server.

In an implementation, the receiving unit 220 is configured to receive an uplink measurement packet from the UPF, where the uplink measurement packet carries the parameter, the parameter includes time at which the UPF sends the uplink measurement packet, and the uplink measurement packet is triggered by the first device; and the processing unit 230 is configured to determine an uplink communication KPI between the UPF and the first server based on the parameter.

In an implementation, the sending unit 210 is further configured to send the uplink communication KPI between the UPF and the first server to the UPF.

In an implementation, the first downlink measurement packet further carries time at which the first server receives the first uplink measurement packet, or transmission time of the first uplink measurement packet between the UPF and the first server.

In an implementation, the sending unit 210 is further configured to send the communication KPI corresponding to the first device to an ECS, an EAS, or the target terminal device.

In an implementation, the first device is a target terminal device, and the processing unit 230 is further configured to determine the target terminal device based on measurement configuration information, where the measurement configuration information includes at least one of a measurement area and application information.

In an implementation, the target terminal device is located in the measurement area; or the target terminal device is installed with an application corresponding to the application information; or the target terminal device is installed with an application corresponding to the application information, and the target terminal device is located in the measurement area.

In an implementation, the receiving unit 220 is further configured to: receive the measurement configuration information from a second server; or receive the application information from a terminal device.

In an implementation, the first device is a target terminal device, and the processing unit 23o is further configured to: obtain identification information of one or more terminal devices from the EAS, where the one or more terminal devices are terminal devices connected to the EAS; and determine a terminal device corresponding to the identification information of the one or more terminal devices as the target terminal device.

The information transmission apparatus in this embodiment of this application may be configured to execute the technical solutions of the first server in the method embodiments in FIG. 6 to FIG. 14. Their implementation principles and technical effects are similar, and details are not described herein again.

Figure 26:
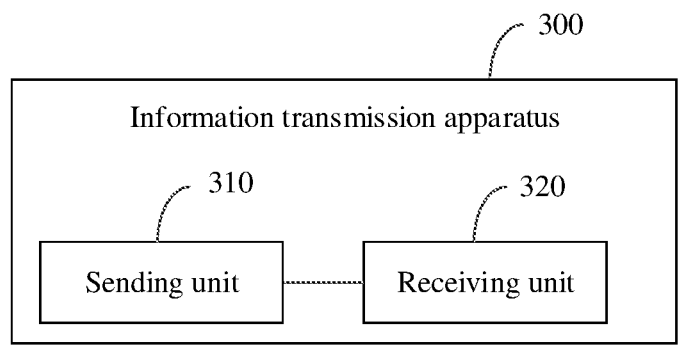
FIG. 26 is a schematic structural diagram of an information transmission apparatus according to an embodiment of this application.

FIG. 26 is a schematic structural diagram of an information transmission apparatus according to an embodiment of this application. The information transmission apparatus may be a PCF, or may be a component (for example, an integrated circuit or a chip) of the PCF. As shown in FIG. 26, the information transmission apparatus 300 may include a sending unit 310 and a receiving unit 320.

The receiving unit 320 is configured to receive first information from a first server, where the first information is for measuring a communication key performance indicator KPI corresponding to a first device, and the communication KPI includes a communication KPI between a user plane function UPF and the first server.

The sending unit 310 is configured to send a communication indicator measurement policy to a session management function SMF based on the first information, where the communication indicator measurement policy indicates to measure the communication KPI corresponding to the first device.

In an implementation, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation, the communication indicator measurement policy includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure a communication KPI between the UPF and the first server.

The information transmission apparatus in this embodiment of this application may be configured to execute the technical solutions of the PCF in the method embodiments. Their implementation principles and technical effects are similar, and details are not described herein again.

Figure 27:
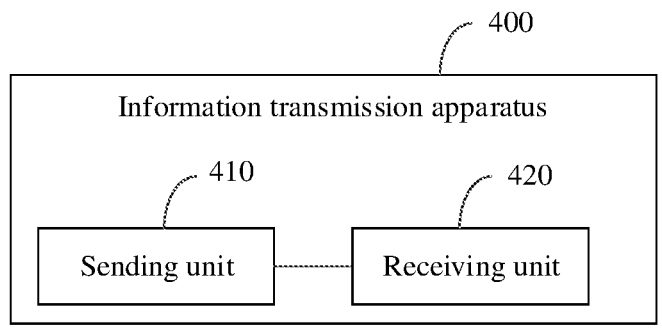
FIG. 27 is a schematic structural diagram of an information transmission apparatus according to an embodiment of this application.

FIG. 27 is a schematic structural diagram of an information transmission apparatus according to an embodiment of this application. The information transmission apparatus may be an SMF, or may be a component (for example, an integrated circuit or a chip) of the SMF. As shown in FIG. 27, the information transmission apparatus 400 may include a sending unit 410 and a receiving unit 420.

The receiving unit 420 is configured to receive a communication indicator measurement policy from a policy control function PCF, where the communication indicator measurement policy indicates to measure a communication key performance indicator KPI corresponding to a first device.

The sending unit 410 is configured to send a communication indicator measurement rule to a user plane function UPF according to the communication indicator measurement policy, where the communication indicator measurement rule is for measuring the communication KPI corresponding to the first device, and the communication KPI includes a communication KPI between the UPF and the first server.

In an implementation, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In an implementation, the communication indicator measurement rule includes the communication indicator measurement policy.

In an implementation, the communication indicator measurement policy includes: a measurement indication; or service description information, a to-be-measured communication KPI, and information about the first server; or a measurement indication, service description information, a to-be-measured communication KPI, and information about the first server, where the measurement indication indicates to measure a communication KPI between the first device and the first server, or indicates to measure the communication KPI between the UPF and the first server.

The information transmission apparatus in this embodiment of this application may be configured to execute the technical solutions of the SMF in the method embodiments. Their implementation principles and technical effects are similar, and details are not described herein again.

Figure 28:
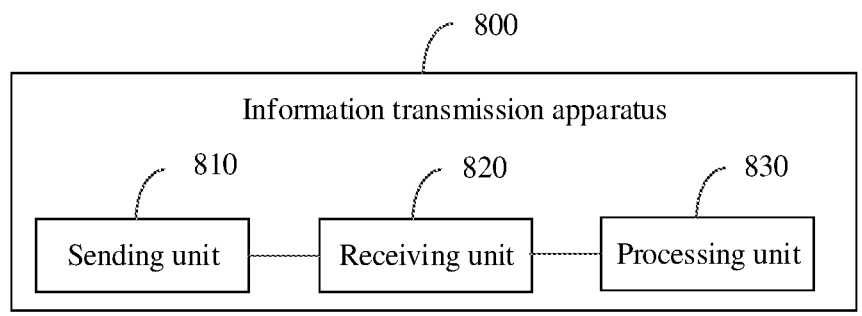
FIG. 28 is a schematic structural diagram of an information transmission apparatus according to an embodiment of this application.

FIG. 28 is a schematic structural diagram of an information transmission apparatus according to an embodiment of this application. The information transmission apparatus may be a UPF, or may be a component (for example, an integrated circuit or a chip) of the UPF. As shown in FIG. 28, the information transmission apparatus 800 may include a sending unit 810 and a receiving unit 820.

The receiving unit 820 is configured to receive a communication indicator measurement rule from a session management function SMF, where the communication indicator measurement rule is for measuring a communication key performance indicator KPI corresponding to a first device.

The sending unit Bio is configured to send second information to a first server according to the communication indicator measurement rule, where the second information includes the communication KPI corresponding to the first device, or a parameter for obtaining the communication KPI corresponding to the first device.

The communication KPI includes a communication KPI between the UPF and the first server.

In some embodiments, the first device is a target terminal device or a radio access network device, and the communication KPI further includes a communication KPI between the first device and the UPF; or the first device is a target terminal device, and the communication KPI further includes a communication KPI between the first device and a radio access network and a communication KPI between the radio access network and the UPF.

In some embodiments, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In some embodiments, the sending unit 810 is specifically configured to send a first uplink measurement packet to the first server according to the communication indicator measurement rule, where the first uplink measurement packet carries the parameter, the parameter includes time at which the UPF sends the first uplink measurement packet, and the first uplink measurement packet is triggered by the first device; and the receiving unit 820 is configured to receive a first downlink measurement packet from the first server, where the first downlink measurement packet carries time at which the first server sends the first downlink measurement packet, and a destination device of the first downlink measurement packet is the first device.

In some embodiments, the apparatus further includes a processing unit 830.

The processing unit 830 is configured to: obtain the communication KPI between the UPF and the first server according to the communication indicator measurement rule; and obtain, based on the communication KPI between the UPF and the first server, the communication KPI corresponding to the first device.

The sending unit 810 is configured to send the communication KPI corresponding to the first device to the first server.

In some embodiments, the processing unit 830 is configured to determine a downlink communication KPI between the UPF and the first server according to the communication indicator measurement rule and the first downlink measurement packet, where the communication KPI between the UPF and the first server includes the downlink communication KPI between the UPF and the first server.

In some embodiments, the first downlink measurement packet further carries time at which the first server receives the first uplink measurement packet, or transmission time of the first uplink measurement packet between the UPF and the first server; and the processing unit 830 is specifically configured to determine an uplink communication KPI between the UPF and the first server according to the communication indicator measurement rule and the first downlink measurement packet, where the communication KPI between the UPF and the first server includes the uplink communication KPI between the UPF and the first server.

In some embodiments, the first device is a target terminal device or a radio access network device, and the processing unit 830 is specifically configured to: obtain the communication KPI between the first device and the UPF; and obtain the communication KPI between the first device and the first server based on the communication KPI between the first device and the UPF and the communication KPI between the UPF and the first server.

In some embodiments, the sending unit Bio is configured to send an uplink measurement packet to the first server, where the uplink measurement packet carries the parameter, the parameter includes time at which the UPF sends the uplink measurement packet, and the uplink measurement packet is triggered by the first device.

In some embodiments, the receiving unit 820 is configured to receive an uplink communication KPI between the UPF and the first server from the first server.

In some embodiments, the parameter further includes a downlink parameter, and the downlink parameter includes time at which the UPF receives the first downlink measurement packet, or transmission time of the first downlink measurement packet between the UPF and the first server.

The information transmission apparatus in this embodiment of this application may be configured to execute the technical solutions of the UPF in the method embodiments. Their implementation principles and technical effects are similar, and details are not described herein again.

Figure 29:
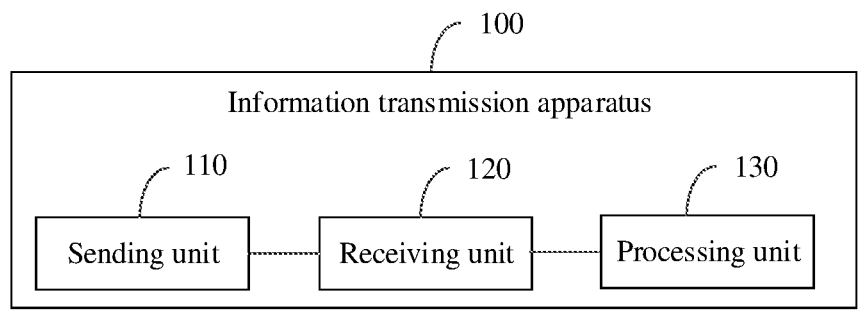
FIG. 29 is a schematic structural diagram of an information transmission apparatus according to an embodiment of this application.

FIG. 29 is a schematic structural diagram of an information transmission apparatus according to an embodiment of this application. The information transmission apparatus may be a first server, or may be a component (for example, an integrated circuit or a chip) of the first server. As shown in FIG. 29, the information transmission apparatus 100 may include a sending unit no and a receiving unit 120.

The sending unit no is configured to send measurement indication information to a target terminal device, where the measurement indication information indicates to measure a communication KPI between the target terminal device and the first server.

The receiving unit 120 is configured to receive third information from the target terminal device, where the third information includes the communication KPI between the target terminal device and the first server, or a parameter for obtaining the communication KPI between the target terminal device and the first server.

In some embodiments, when the third information includes the parameter for obtaining the communication KPI between the target terminal device and the first server, the apparatus further includes a processing unit 130.

The processing unit 130 is configured to obtain the communication KPI between the target terminal device and the first server based on the third information.

In some embodiments, the measurement indication information includes: a measurement indication; or service description information, a to-be-measured communication KPI, and information about the first server; or a measurement indication, service description information, a to-be-measured communication KPI, and information about the first server, where the measurement indication indicates to measure the KPI between the target terminal device and the first server.

In some embodiments, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In some embodiments, the receiving unit 120 is configured to receive a first uplink measurement packet from the target terminal device, where the first uplink measurement packet carries the parameter, and the parameter includes time at which the target terminal device sends the first uplink measurement packet; and the sending unit no is configured to send a first downlink measurement packet to the target terminal device, where the first downlink measurement packet carries time at which the first server sends the first downlink measurement packet.

In some embodiments, the parameter further includes a downlink parameter, and the downlink parameter includes time at which the target terminal device receives the first downlink measurement packet, or transmission time of the first downlink measurement packet between the target terminal device and the first server; and the processing unit 130 is specifically configured to obtain a downlink communication KPI between the target terminal device and the first server based on the downlink parameter.

In some embodiments, the processing unit 130 is specifically configured to obtain an uplink communication KPI between the target terminal device and the first server based on time at which the target terminal device sends the first uplink measurement packet.

In some embodiments, the receiving unit 120 is configured to receive an uplink measurement packet from the target terminal device, where the uplink measurement packet carries the parameter, and the parameter includes time at which the target terminal device sends the uplink measurement packet; and the processing unit 130 is specifically configured to determine an uplink communication KPI between the target terminal device and the first server based on the parameter.

In some embodiments, the sending unit no is further configured to send the uplink communication KPI between the target terminal device and the first server to the target terminal device.

In some embodiments, the first downlink measurement packet further carries time at which the first server receives the first uplink measurement packet, or transmission time of the first uplink measurement packet between the target terminal device and the first server.

In some embodiments, the sending unit no is further configured to send the communication KPI between the target terminal device and the first server to an ECS, an EAS, or the target terminal device.

In some embodiments, the processing unit 130 is further configured to determine the target terminal device based on measurement configuration information, where the measurement configuration information includes at least one of a measurement area and application information.

In some embodiments, the target terminal device is located in the measurement area; or the target terminal device is installed with an application corresponding to the application information; or the target terminal device is installed with an application corresponding to the application information, and the target terminal device is located in the measurement area.

In some embodiments, the receiving unit 120 is further configured to: receive the measurement configuration information from a second server; or receive the application information from a terminal device.

In some embodiments, the processing unit 130 is further configured to: obtain identification information of one or more terminal devices from the EAS, where the one or more terminal devices are terminal devices connected to the EAS; and determine a terminal device corresponding to the identification information of the one or more terminal devices as the target terminal device.

The information transmission apparatus in this embodiment of this application may be configured to execute the technical solutions of the first server in the method embodiments in FIG. 15 to FIG. 24. Their implementation principles and technical effects are similar, and details are not described herein again.

Figure 30:
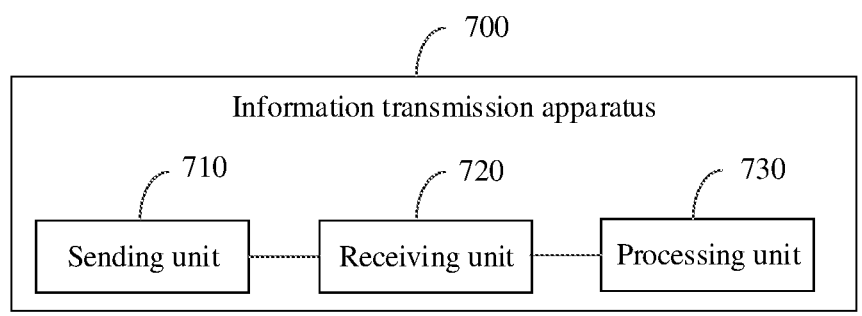
FIG. 30 is a schematic structural diagram of an information transmission apparatus according to an embodiment of this application.

FIG. 30 is a schematic structural diagram of an information transmission apparatus according to an embodiment of this application. The information transmission apparatus may be a target terminal device, or may be a component (for example, an integrated circuit or a chip) of the target terminal device. As shown in FIG. 30, the information transmission apparatus 700 may include a sending unit 710 and a receiving unit 720.

The receiving unit 720 is configured to receive measurement indication information from a first server, where the measurement indication information indicates to measure a communication KPI between the target terminal device and the first server; and the sending unit 710 is configured to send third information to the first server based on the measurement indication information.

The third information includes: the communication KPI between the target terminal device and the first server, or a parameter for obtaining the communication KPI between the target terminal device and the first server.

In some embodiments, the measurement indication information includes: a measurement indication; or service description information, a to-be-measured communication KPI, and information about the first server; or a measurement indication, service description information, a to-be-measured communication KPI, and information about the first server, where the measurement indication indicates to measure the KPI between the target terminal device and the first server.

In some embodiments, the communication KPI includes at least one of the following: an uplink communication KPI, a downlink communication KPI, or a round trip delay; and the uplink communication KPI includes at least one of the following: a maximum uplink delay, a minimum uplink delay, an average uplink delay, a maximum uplink jitter, a minimum uplink jitter, and an average uplink jitter; and the downlink communication KPI includes at least one of the following: a maximum downlink delay, a minimum downlink delay, an average downlink delay, a maximum downlink jitter, a minimum downlink jitter, and an average downlink jitter.

In some embodiments, the sending unit 710 is configured to send a first uplink measurement packet to the first server based on the measurement indication information, where the first uplink measurement packet carries the parameter, and the parameter includes time at which the target terminal device sends the first uplink measurement packet; and the receiving unit 720 is configured to receive a first downlink measurement packet from the first server, where the first downlink measurement packet carries time at which the first server sends the first downlink measurement packet.

In some embodiments, the apparatus further includes a processing unit 730.

The processing unit 730 is configured to obtain the communication KPI between the target terminal device and the first server based on the measurement indication information.

The sending unit 710 is configured to send the communication KPI between the target terminal device and the first server to the first server.

In some embodiments, the processing unit 730 is specifically configured to determine a downlink communication KPI between the target terminal device and the first server based on the measurement indication information and the first downlink measurement packet, where the communication KPI between the target terminal device and the first server includes the downlink communication KPI between the target terminal device and the first server.

In some embodiments, the first downlink measurement packet further carries time at which the first server receives the first uplink measurement packet, or transmission time of the first uplink measurement packet between the target terminal device and the first server.

The processing unit 730 is specifically configured to determine an uplink communication KPI between the target terminal device and the first server based on the measurement indication information and the first downlink measurement packet, where the communication KPI between the target terminal device and the first server includes the uplink communication KPI between the target terminal device and the first server.

In some embodiments, the sending unit 710 is further configured to send an uplink measurement packet to the first server based on the measurement indication information, where the uplink measurement packet carries the parameter, and the parameter includes time at which the target terminal device sends the uplink measurement packet.

In some embodiments, the receiving unit 720 is configured to receive an uplink communication KPI between the target terminal device and the first server from the first server.

In some embodiments, the parameter further includes time at which the target terminal device receives the first downlink measurement packet, or transmission time of the first downlink measurement packet between the target terminal device and the first server.

The information transmission apparatus in this embodiment of this application may be configured to execute the technical solutions of the target terminal device in the method embodiments in FIG. 15 to FIG. 24. Their implementation principles and technical effects are similar, and details are not described herein again.

Figure 31:
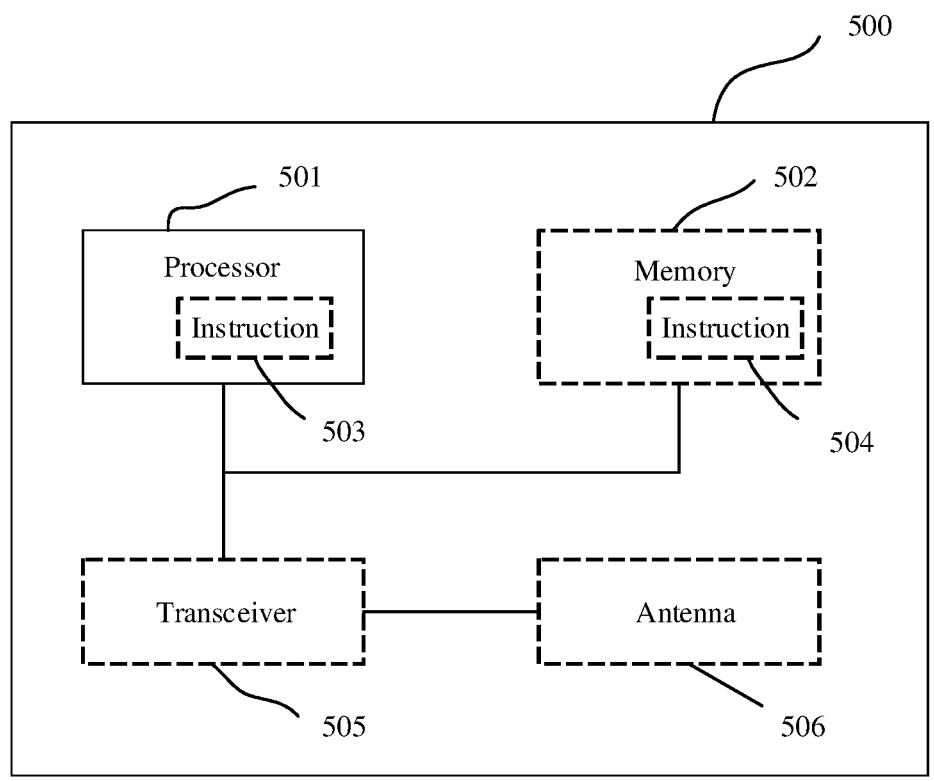
FIG. 31 is a schematic structural diagram of a communication device according to an embodiment of this application.

FIG. 31 is a schematic structural diagram of a communication device according to an embodiment of this application. As shown in FIG. 31, the communication device 500 in this embodiment may be the radio access network device or the target terminal device mentioned in the foregoing method embodiments, or a component of the foregoing devices. The communication device may be configured to implement the foregoing method embodiments. For details, refer to the descriptions in the foregoing method embodiments.

The communication device 500 may include one or more processors 501. The processor 501 may also be referred to as a processing unit, and can implement a specific control or processing function. The processor 501 may be a general-purpose processor, a dedicated processor, or the like. For example, the processor may be a baseband processor or a central processing unit. The baseband processor may be configured to process a communication protocol and communication data. The central processing unit may be configured to: control a communication device, execute a software program, and process data of the software program.

In a possible design, the processor 501 may also store instructions 503 or data (for example, intermediate data). The instructions 503 may be run by a processor, to enable the communication device 500 to perform the method that corresponds to the first communication device or the second communication device and that is described in the foregoing method embodiments.

In another possible design, the communication device 500 may include a circuit, and the circuit may implement the sending function, the receiving function, or the communication function in the foregoing method embodiments.

Optionally, the communication device 500 may include one or more memories 502 that may store instructions 504. The instructions 504 may be run on the processor, to enable the communication device 500 to perform the methods described in the foregoing method embodiments.

Optionally, the processor 501 and the memory 502 may be separately disposed, or may be integrated together.

Optionally, the communication device 500 may further include a transceiver 505 and/or an antenna 506. The processor 501 may be referred to as a processing unit, and is configured to control the communication device (for example, the first communication device or the second communication device). The transceiver 505 may be referred to as a transceiver unit, a transceiver machine, a transceiver circuit, a transceiver, or the like, and is configured to implement receiving and sending functions of the communication device.

The processor 501 and the transceiver 505 described in this application may be implemented in an integrated circuit (IC), an analog IC, a radio frequency integrated circuit (RFIC), a hybrid signal IC, an application-specific integrated circuit (ASIC), a printed circuit board (PCB), an electronic device, and the like. The processor 501 and the transceiver 505 may alternatively be manufactured by using various 1C process technologies, for example, a complementary metal oxide semiconductor (CMOS), an N-type metal oxide semiconductor (nMetal-oxide-semiconductor, NMOS), a P-channel metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communication device 500 is described as an example. However, a scope of the communication device described in this application is not limited to the target terminal device or the radio access network device, and a structure of the communication device may not be limited by FIG. 31.

The communication device in this embodiment of this application may be configured to execute the technical solutions of the target terminal device or the radio access network device in the foregoing method embodiments. Their implementation principles and technical effects are similar, and details are not described herein again.

Figure 32:
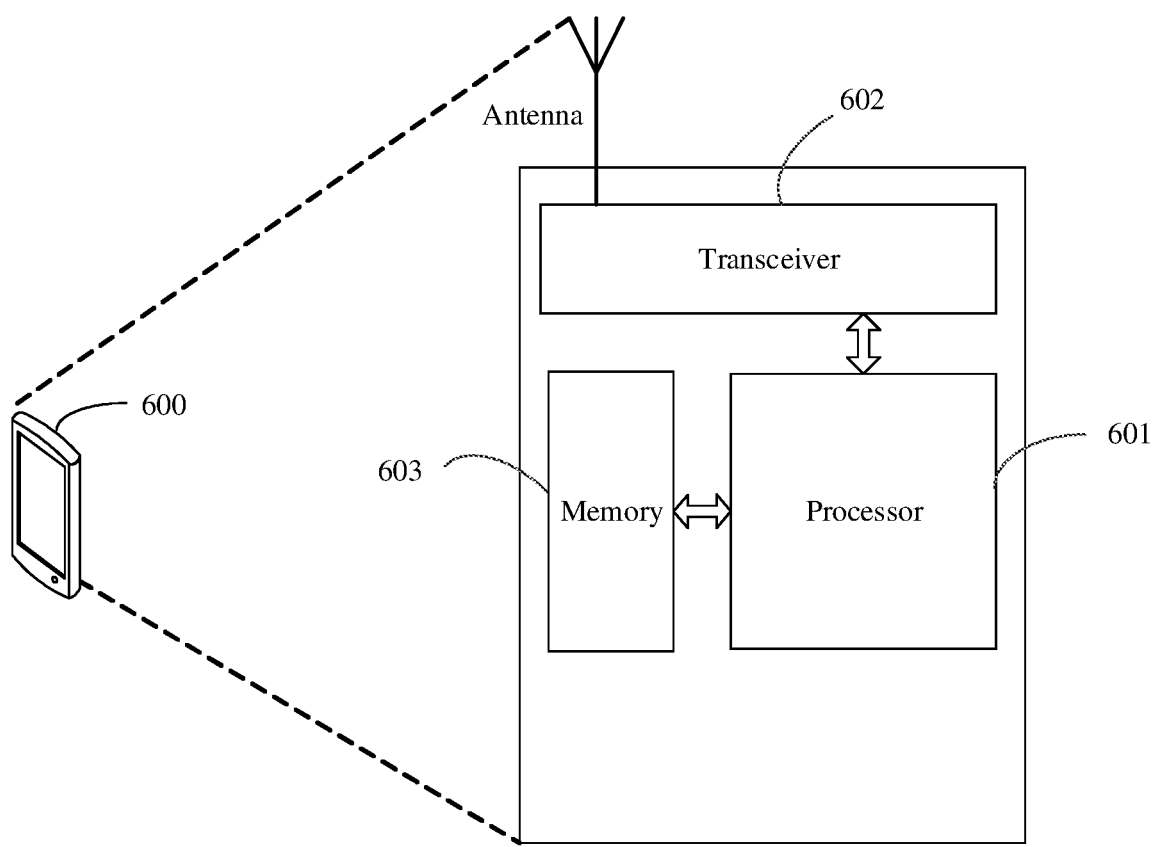
FIG. 32 is a schematic structural diagram of a terminal device according to an embodiment of this application.

FIG. 32 is a schematic structural diagram of a target terminal device according to an embodiment of this application. The target terminal device 600 may implement functions performed by the target terminal device in the foregoing method embodiments. The functions may be implemented by hardware, or may be implemented by hardware executing corresponding software. The hardware or software includes one or more modules or units corresponding to the foregoing functions.

In a possible design, a structure of the target terminal device 600 includes a processor 601, a transceiver 602, and a memory 603. The processor 601 is configured to support the target terminal device 600 in performing a corresponding function in the foregoing methods. The transceiver 602 is configured to support communication between the target terminal device 600 and another terminal device or network device. The target terminal device 600 may further include the memory 603. The memory 603 is configured to be coupled to the processor 601, and stores program instructions and data that are necessary for the target terminal device 600.

After the target terminal device 600 is powered on, the processor 601 may read the program instructions and the data in the memory 603, interpret and execute the program instructions, and process data of the program instructions. When data is to be sent, after performing baseband processing on the to-be-sent data, the processor 601 outputs a baseband signal to the transceiver 602. After performing radio frequency processing on the baseband signal, the transceiver 602 sends a radio frequency signal in a form of an electromagnetic wave through an antenna. When data is sent to the terminal device, the transceiver 602 receives a radio frequency signal through the antenna, converts the radio frequency signal into a baseband signal, and outputs the baseband signal to the processor 601. The processor 601 converts the baseband signal into data and processes the data.

A person skilled in the art may understand that for ease of description, FIG. 32 shows only one memory 603 and only one processor 601. Actually, the target terminal device 600 may include a plurality of processors 601 and a plurality of memories 603. The memory 603 may also be referred to as a storage medium, a storage device, or the like. This is not limited in this embodiment of this application.

The terminal device in this embodiment of this application may be configured to execute the technical solutions of the target terminal device in the foregoing method embodiments. Their implementation principles and technical effects are similar, and details are not described herein again.

Figure 33:
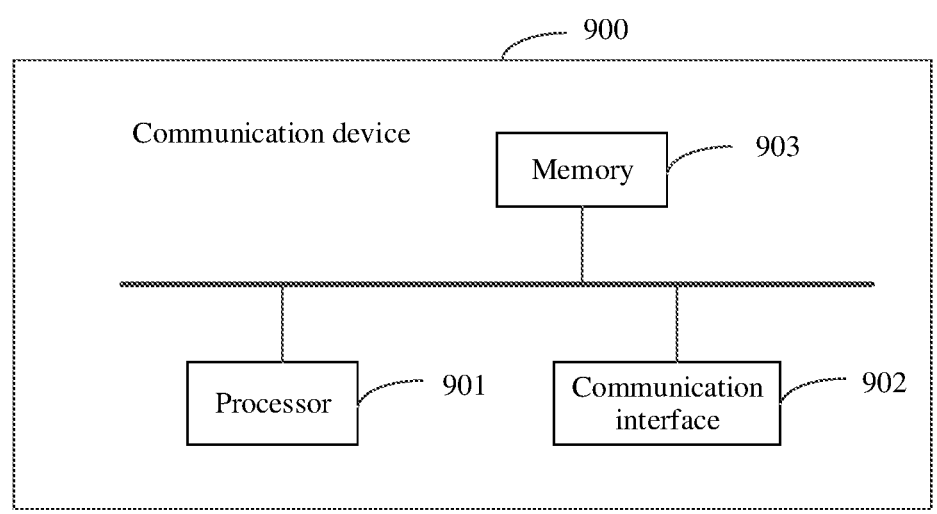
FIG. 33 is a schematic structural diagram of a communication device according to an embodiment of this application.

FIG. 33 is a schematic structural diagram of a communication device according to an embodiment of this application. The communication device 900 may implement functions performed by the first server, the PCF, the SMF, or the UPF in the foregoing method embodiments. The functions may be implemented by hardware, or may be implemented by hardware by executing corresponding software. The hardware or software includes one or more modules or units corresponding to the foregoing functions.

In a possible design, a structure of the communication device 900 includes a processor 901 and a communication interface 902, and the processor 901 is configured to support the communication device 900 in performing a corresponding function in the foregoing methods. The communication interface 902 is configured to support communication between the communication device 900 and another network element. The communication device 900 may further include a memory 903. The memory 903 is configured to be coupled to the processor 901, and the memory 903 stores program instructions and data that are necessary for the communication device 900.

A person skilled in the art may understand that for ease of description, FIG. 33 shows only one memory 903 and only one processor 901. Actually, the communication device 900 may include a plurality of processors 901 and a plurality of memories 903. The memory 903 may also be referred to as a storage medium, a storage device, or the like. This is not limited in this embodiment of this application.

The communication device in this embodiment of this application may be configured to execute the technical solutions of the first server, the PCF, the SMF, or the UPF in the foregoing method embodiments. Their implementation principles and technical effects are similar, and details are not described herein again.

Figure 34:
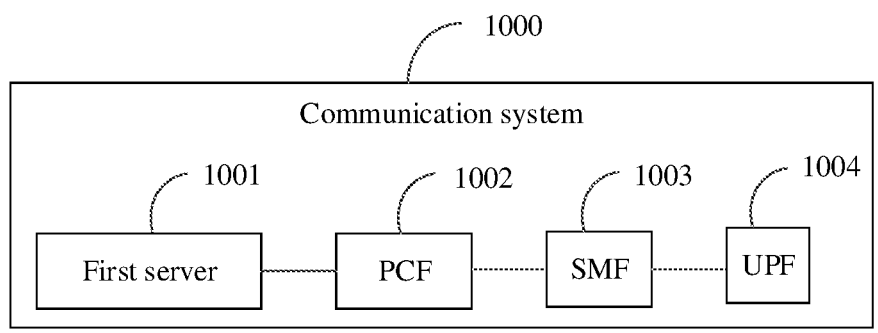
FIG. 34 is a schematic structural diagram of a communication system according to an embodiment of this application.

FIG. 34 is a schematic structural diagram of a communication system according to an embodiment of this application. As shown in FIG. 34, the communication system 1000 in this embodiment of this application includes a first server 1001, a PCF 1002, an SMF 1003, and a UPF 1004. The first server, the PCF, the SMF, and the UPF are configured to implement the technical solutions in the method embodiments shown in FIG. 6 to FIG. 14. Their implementation principles and technical effects are similar, and details are not described herein again.

Figure 35:
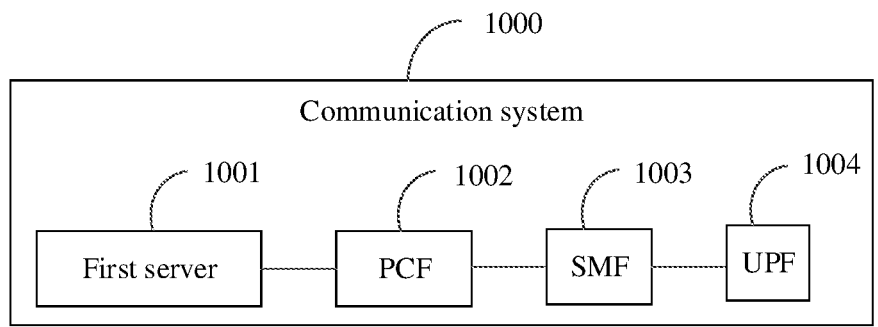
FIG. 35 is a schematic structural diagram of a communication system according to an embodiment of this application.

FIG. 35 is a schematic structural diagram of a communication system according to an embodiment of this application. As shown in FIG. 35, the communication system 2000 in this embodiment of this application includes the foregoing first server and target terminal device. The first server and the target terminal device are configured to implement the technical solutions in the method embodiments shown in FIG. 15 to FIG. 24. Their implementation principles and technical effects are similar, and details are not described herein again.

An embodiment of this application further provides a chip, including a processor. The processor is configured to run a computer program, to enable an electronic device installed with the chip to perform the method in any one of the embodiments shown in FIG. 6 to FIG. 24.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

It may be clearly understood by persons skilled in the art that for convenient and brief description, for a detailed working process of the described system, apparatus, and unit, refer to a corresponding process in the foregoing method embodiments, and details are not described herein again. In addition, the method embodiments and the apparatus embodiments may also be mutually referenced. Same or corresponding content in different embodiments may be mutually cited, and details are not described again.

What is claimed is:

1. A method performed by a policy control function network entity, comprising:
   receiving first information from a first server, wherein the first information is for measuring a communication key performance indicator (KPI) corresponding to a user plane function network entity; and
   sending, based on the first information, a communication indicator measurement policy to a session management function network entity, wherein the communication indicator measurement policy indicates to measure the communication KPI corresponding to the user plane function network entity.

2. The method according to claim 1, further comprising:
   sending, by the session management function network entity based on the communication indicator measurement policy, a communication indicator measurement rule to the user plane function network entity, wherein the communication indicator measurement rule is for measuring the communication KPI corresponding to the user plane function network entity.

3. The method according to claim 2, wherein the communication indicator measurement policy comprises a measurement indication indicating to measure the communication KPI corresponding to the user plane function network entity, and the measurement indication comprises an N6 interface measurement indication, and an N6 interface is a communication interface between the user plane function network entity and the first server.

4. The method according to claim 1, wherein the communication indicator measurement policy is carried in a quality of service (QoS) policy from the policy control function network entity to the session management function network entity.

5. The method according to claim 1, wherein the first information comprises at least one of:
   a measurement indication; or
   information about the first server, wherein the measurement indication indicates to measure the communication KPI between the user plane function network entity and the first server.

6. The method according to claim 5, wherein the information about the first server comprises: an address of the first server, or a port number of the first server.

7. The method according to claim 1, wherein the communication KPI comprises at least one of: an uplink communication KPI, a downlink communication KPI, or a round trip delay; and
   the uplink communication KPI comprises at least one of: a maximum uplink delay, a minimum uplink delay, an average uplink delay, a maximum uplink jitter, a minimum uplink jitter, or an average uplink jitter; and
   the downlink communication KPI comprises at least one of: a maximum downlink delay, a minimum downlink delay, an average downlink delay, a maximum downlink jitter, a minimum downlink jitter, or an average downlink jitter.

8. A method performed by a user plane function network entity, comprising:
   receiving a communication indicator measurement rule from a session management function network entity, wherein the communication indicator measurement rule is for measuring a communication key performance indicator (KPI) corresponding to the user plane function network entity; and
   sending second information according to the communication indicator measurement rule, wherein the second information comprises the communication KPI, and the communication KPI comprises a communication KPI between the user plane function network entity and a first server.

9. The method according to claim 8, wherein the communication indicator measurement rule comprises a measurement indication indicating to measure the communication KPI corresponding to the user plane function network entity, and the measurement indication comprises an N6 interface measurement indication, and an N6 interface is a communication interface between the user plane function network entity and the first server.

10. The method according to claim 8, wherein the communication indicator measurement rule comprises: a protocol type of a measurement packet.

11. A system, comprising:
a policy control function network entity, a session management function network entity, and a user plane function network entity, wherein:
the policy control function network entity is configured to:
receive first information from a first server, wherein the first information is for measuring a communication key performance indicator (KPI) corresponding to the user plane function network entity; and
send, based on the first information, a communication indicator measurement policy to the session management function network entity, wherein the communication indicator measurement policy indicates to measure the communication KPI corresponding to the user plane function network entity; and
the session management function network entity is configured to:
send, based on the communication indicator measurement policy, a communication indicator measurement rule, wherein the communication indicator measurement rule is for measuring the communication KPI corresponding to the user plane function network entity.

12. The system according to claim 11, wherein the user plane function network entity is configured to receive the communication indicator measurement rule, and send second information according to the communication indicator measurement rule, wherein the second information comprises the communication KPI, and the communication KPI comprises a communication KPI between the user plane function network entity and the first server.

13. The system according to claim 11, wherein the communication indicator measurement policy is carried in a quality of service (QOS) policy from the policy control function network entity to the session management function network entity.

14. The system according to claim 11, wherein the first information comprises at least one of:
a measurement indication; or
information about the first server, wherein the measurement indication indicates to measure the communication KPI between the user plane function network entity and the first server.

15. The system according to claim 14, wherein the information about the first server comprises: an address of the first server, or a port number of the first server.

16. The system according to claim 11, wherein the communication KPI comprises at least one of: an uplink communication KPI, a downlink communication KPI, or a round trip delay; and
the uplink communication KPI comprises at least one of: a maximum uplink delay, a minimum uplink delay, an average uplink delay, a maximum uplink jitter, a minimum uplink jitter, or an average uplink jitter; and
the downlink communication KPI comprises at least one of: a maximum downlink delay, a minimum downlink delay, an average downlink delay, a maximum downlink jitter, a minimum downlink jitter, or an average downlink jitter.

17. The system according to claim 11, wherein the communication indicator measurement policy comprises a measurement indication indicating to measure the communication KPI corresponding to the user plane function network entity, and the measurement indication comprises an N6 interface measurement indication, and an N6 interface is a communication interface between the user plane function network entity and the first server.

18. The system according to claim 11, wherein the communication indicator measurement rule comprises a measurement indication indicating to measure the communication KPI corresponding to the user plane function network entity, and the measurement indication comprises an N6 interface measurement indication, and an N6 interface is a communication interface between the user plane function network entity and the first server.

19. The system according to claim 11, wherein the communication indicator measurement rule comprises: a protocol type of a measurement packet.

* * * * *

UNITED STATES PATENT AND TRADEMARK OFFICE
CERTIFICATE OF CORRECTION

PATENT NO. : 12,477,374 B2
APPLICATION NO. : 18/154176
DATED : November 18, 2025
INVENTOR(S) : Ge et al.

Page 1 of 1

It is certified that error appears in the above-identified patent and that said Letters Patent is hereby corrected as shown below:

In the Claims

In Column 70, in Claim 13, Line 3, delete "(QOS)" and insert -- (QoS) --.

Signed and Sealed this
Thirteenth Day of January, 2026

John A. Squires
*Director of the United States Patent and Trademark Office*